(12) United States Patent
Ashrafi

(10) Patent No.: US 10,755,188 B2
(45) Date of Patent: Aug. 25, 2020

(54) UNIFIED NONLINEAR MODELING APPROACH FOR MACHINE LEARNING AND ARTIFICIAL INTELLIGENCE (ATTRACTOR ASSISTED AI)

(71) Applicant: NXGEN PARTNERS IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 73 days.

(21) Appl. No.: 16/161,840

(22) Filed: Oct. 16, 2018

(65) Prior Publication Data

US 2019/0114557 A1    Apr. 18, 2019

Related U.S. Application Data

(60) Provisional application No. 62/574,039, filed on Oct. 18, 2017.

(51) Int. Cl.
  *G06N 7/08*   (2006.01)
  *G06T 1/20*   (2006.01)
  *G06N 20/00*  (2019.01)
  *G06F 16/901* (2019.01)

(52) U.S. Cl.
  CPC .......... *G06N 7/08* (2013.01); *G06F 16/9024* (2019.01); *G06N 20/00* (2019.01); *G06T 1/20* (2013.01)

(58) Field of Classification Search
  CPC .......... G06N 3/049; G06N 20/00; G06N 7/08; G06T 1/20; G06F 16/9024
  See application file for complete search history.

(56) References Cited

U.S. PATENT DOCUMENTS

2008/0256009 A1* 10/2008 Jiang .................... G06N 3/0436
                                                                 706/27
2017/0147722 A1*  5/2017 Greenwood ............ G06F 17/50

OTHER PUBLICATIONS

Vladimir Golovko, Yury Savitsky, and Nikolaj Maniakov, "Chapter 6 Neural Networks for Signal Processing in Measurement Analysis and Industrial Applications", 2003, NATO Science Series Sub Series III Computer and Systems Sciences 185, pp. 119-144. (Year: 2003).*

S. Ashrafi, L. Roszman, and J. Cooley, "Nonlinear Techniques for Forecasting Solar Activity Directly From Its Time Series", May 1992, Proceedings of Flight Mechanics/Estimation Theory Symposium, National Aeronautics and Space Administration. pp. 1-18. (Year: 1992).*

(Continued)

*Primary Examiner* — Kamran Afshar
*Assistant Examiner* — Ying Yu Chen
(74) *Attorney, Agent, or Firm* — Gregory M. Howison

(57) ABSTRACT

A system for predicting future behavior for a dynamic system comprises a processor configured to implement an artificial intelligence system implementing nonlinear modeling and forecasting processing for analyzing the dynamic system. The nonlinear modeling and forecasting processing configures the processor to generate a time series group of data from the dynamic system. The nonlinear modeling and forecasting processing further configures the processor to generate prediction values of future behavior of the dynamic system by using the nonlinear modeling and forecasting implemented on the artificial intelligence system on the time series group of data.

35 Claims, 27 Drawing Sheets

(56) References Cited

OTHER PUBLICATIONS

Lei Zhang, "Artificial Neural Network Model Design and Topology Analysis for FPGA Implementation of Lorenz Chaotic Generator", Apr. 2017, 2017 IEEE 30th Canadian Conference on Electrical and Computer Engineering (CCECE), pp. 1-4. (Year: 2017).*

Ismail Koyuncu, Ahmet Turan Ozcerit, and Ihsan Pehlivan, "Implementation of FPGA-based real time novel chaotic oscillator", 2014, Nonlinear Dyn (2014) 77, pp. 49-59. (Year: 2014).*

Piotr Antonik, Michiel Hermans, Marc Haelterman, and Serge Massar, "Photonic Reservoir Computer With Output Feedback for Chaotic Time Series Prediction", Jul. 3, 2017, IEEE, pp. 2407-2413. (Year: 2017).*

Ricardo de A. Araujo, Adriano L. I. de Oliveira, and Sergio C. B. Soares, "A Quantum-Inspired Hybrid Methodology for Financial Time Series Prediction", 2010 IEEE, pp. 1-8. (Year: 2010).*

S. Ashrafi and L. Roszman, Detecting and Disentangling Nonlinear Structure from Solar Flux Time Series, 43rd Congress of the International Astronautical Federation, Aug. 1992.

S. Ashrafi and L. Roszman, "Evidence of Chaotic Pattern in Solar Flux Through a Reproducible Sequence of Period-Doubling-Type Bifurcations," Proceedings of Flight Mechanics/Estimation Theory Symposium, National Aeronautics and Space Administration, Goddard Space Flight Center, Greenbelt, Maryland, May 1991.

S. Ashrafi, Combining Schatten's Solar Activity Prediction Model With a Chaotic Prediction Model, National Aeronautics and Space Administration, Goddard Space Flight Center, Greenbelt, Maryland, 554-FDD-911125, Nov. 1991.

S. Ashrafi and L. Roszman, "Lyapunov Exponent of Solar Flux Time Series," Proceedings of First Experimental Chaos Conference, Jun. 1991.

S. Ashrafi and L. Roszman, Solar Flux Forecasting Using Mutual Information with Optimal Delay, AAS 93-311, Spaceflight Dynamics 1993, American Astronautical Society Publication, Advances in the Astronautical Sciences, vol. 84 Part II pp. 901-913.

S. Ashrafi and L. Roszman, "Nonlinear Techniques for Forecasting Solar Activity Directly From its Time Series," Proceedings of Flight Mechanics/Estimation Theory Symposium, National Aeronautics and Space Administration, Goddard Space Flight Center, Greenbelt, Maryland May 21-23, 1992.

F. Takens, "Detecting Strange Attractors in Turbulence," in Lecture Notes in Mathematics, vol. 898, 366 Berlin: Springer-Verlag, 1981.

H. Van Loon and K. Labitzke, "Association Between the 11-Year Solar Cycle, the QBO, and the Atmosphere, Part II," J. Climate, 1, 1988.

N. Packard et al., "Geometry From a Time Series," Phys. Rev. Lett., 45, 1980.

J.H. Bentley, "Multidimensional Binary Search Trees in Data Base Applications," IEEE Transactions on Software Engineering, 5 (4), 1979.

J.M. Martinerie et al., "Mutual Information, Strange Attractors, and the Optimal Estimation of Dimension," Phys. Rev. A., 45, 1992.

E. Baake et al., "Fitting Ordinary Differential Equations to Chaotic Data," Phys. Rev. A, 45, 1985.

* cited by examiner

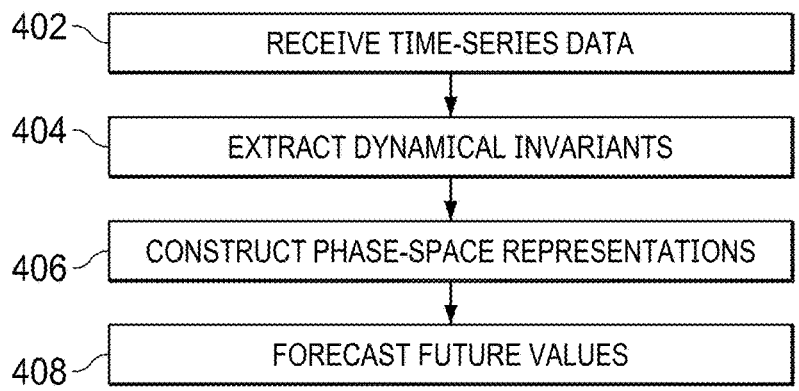
FIG. 4
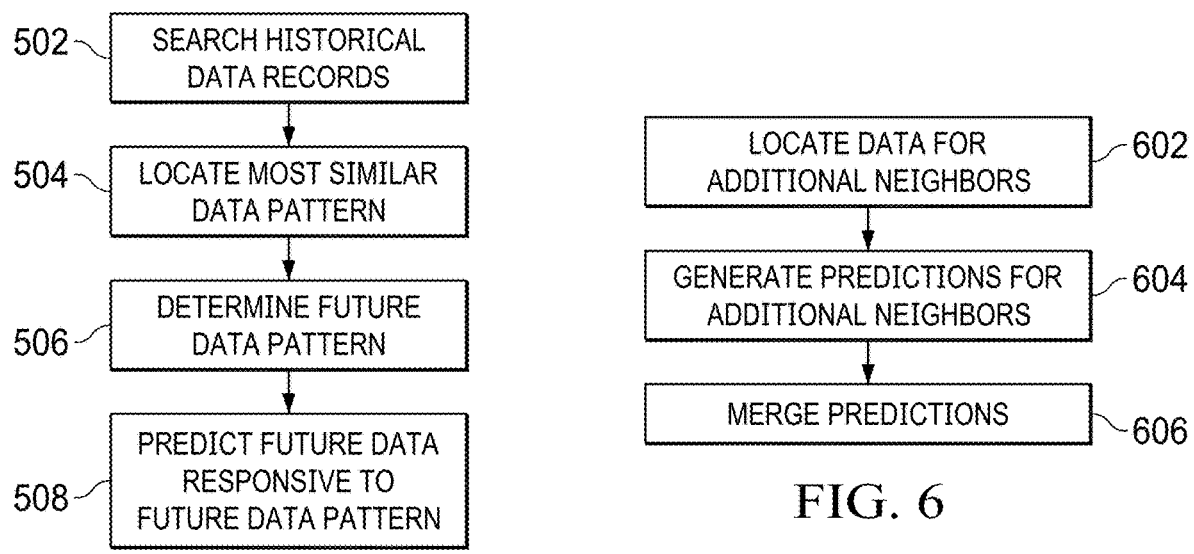
FIG. 5
FIG. 6

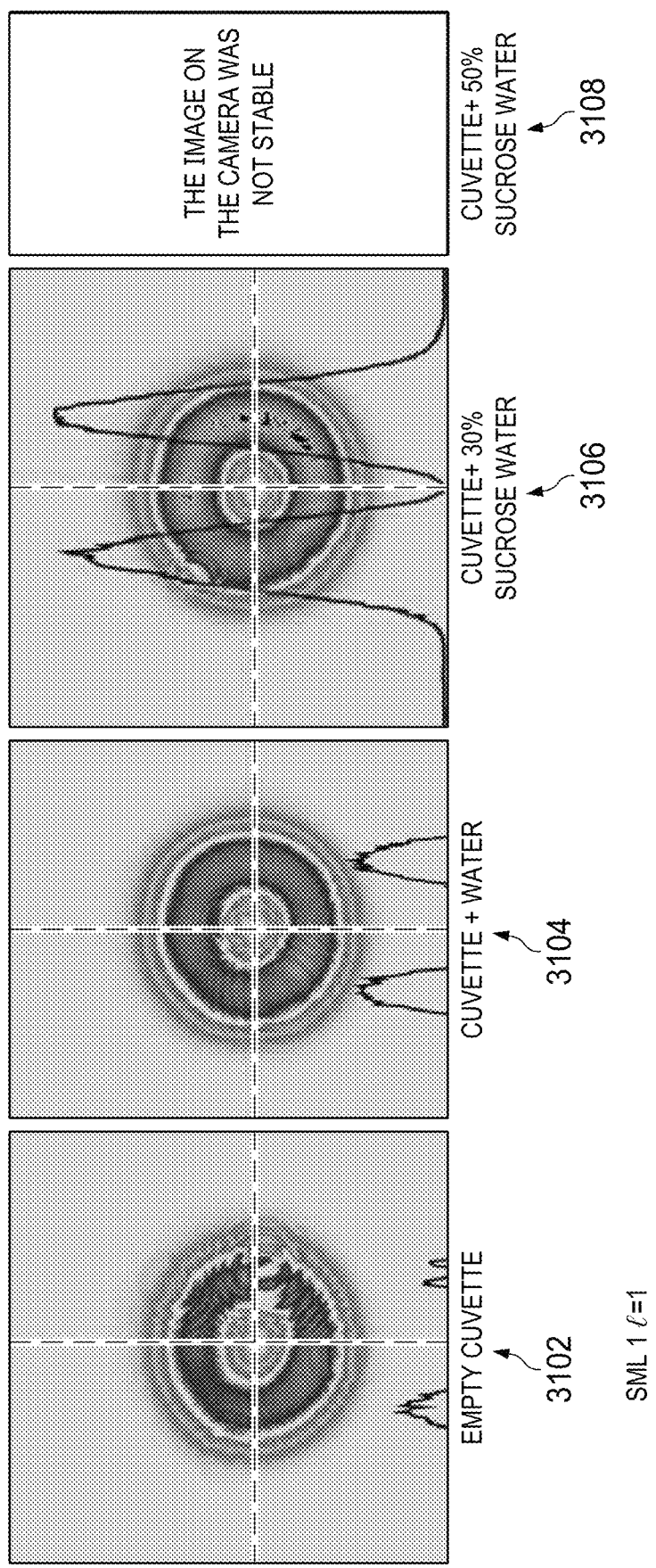

WAITED 30 MINUTES AND BEAM WAS NOT STABLE

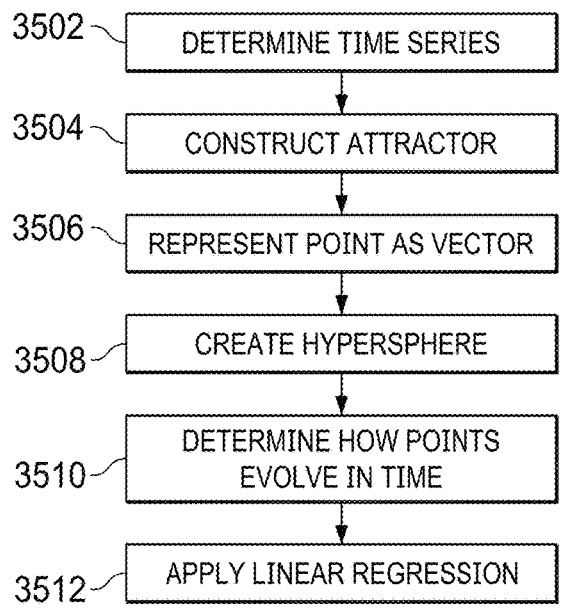
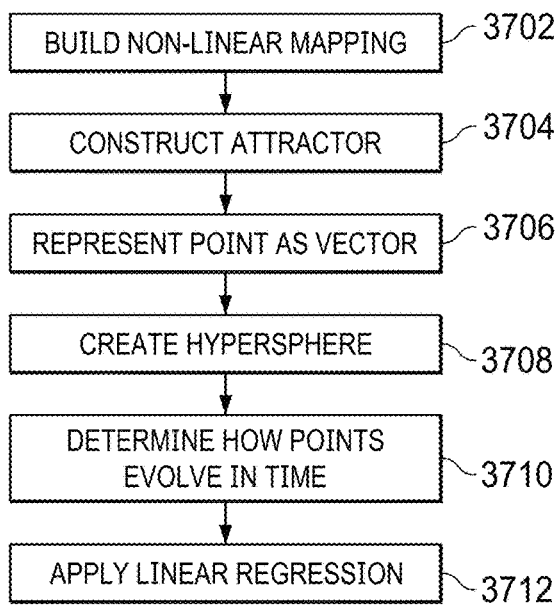
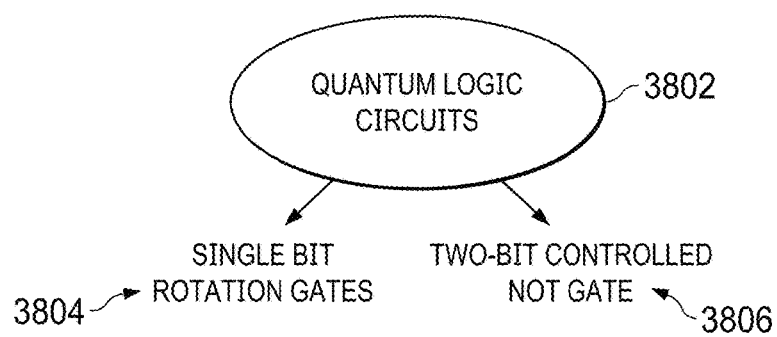

US 10,755,188 B2

UNIFIED NONLINEAR MODELING APPROACH FOR MACHINE LEARNING AND ARTIFICIAL INTELLIGENCE (ATTRACTOR ASSISTED AI)

CROSS-REFERENCE TO RELATED APPLICATIONS

This claims benefit of U.S. Provisional Application No. 62/574,039, filed Oct. 18, 2017, entitled NONLINEAR MODELING AND FORECASTING AND ITS APPLICATION TO ARTIFICIAL INTELLIGENCE, the specification of which is incorporated by reference herein in its entirety.

TECHNICAL FIELD

The present invention relates to artificial intelligence systems, and more particularly, to a method for providing an improved artificial intelligence system using nonlinear modeling and forecasting.

BACKGROUND

Artificial intelligence (AI) systems be used for processing time series data in order to provide predictions of future events. Various techniques have been utilized for predicting future events using AI systems which have varying degrees of effectiveness. Some manner for improving the predictive capabilities of AI systems with respect to time-series data in dynamical and chaotic systems would be of great benefit in the AI system arena.

SUMMARY

The present invention, as disclosed and described herein, in one aspect thereof comprises a system for predicting future behavior for a dynamic system comprises a processor configured to implement an artificial intelligence system implementing nonlinear modeling and forecasting processing for analyzing the dynamic system. The nonlinear modeling and forecasting processing configures the processor to generate a time series group of data from the dynamic system. The nonlinear modeling and forecasting processing further configures the processor to generate prediction values of future behavior of the dynamic system by using the nonlinear modeling and forecasting implemented on the artificial intelligence system on the time series group of data.

BRIEF DESCRIPTION OF THE DRAWINGS

For a more complete understanding, reference is now made to the following description taken in conjunction with the accompanying Drawings in which:

FIG. 4 illustrates a flow diagram of a process enabling AI systems to forecast future values based upon past time-series data;

FIG. 5 illustrates a flow diagram of a process for predicting future data from historical data records;

FIG. 6 illustrates a flow diagram of a process for merging predictions from nearest neighbor approximations;

FIGS. 31-34 illustrates various intensity images taken using the system of FIG. 29;

FIG. 35 illustrates a flow diagram of a process for processing intensity images for glucose and sucrose;

FIG. 37 illustrates a flow diagram of a process for providing an improved extreme learning machine;

FIG. 38 illustrates various types of quantum logic circuits;

DETAILED DESCRIPTION

Figure 1:
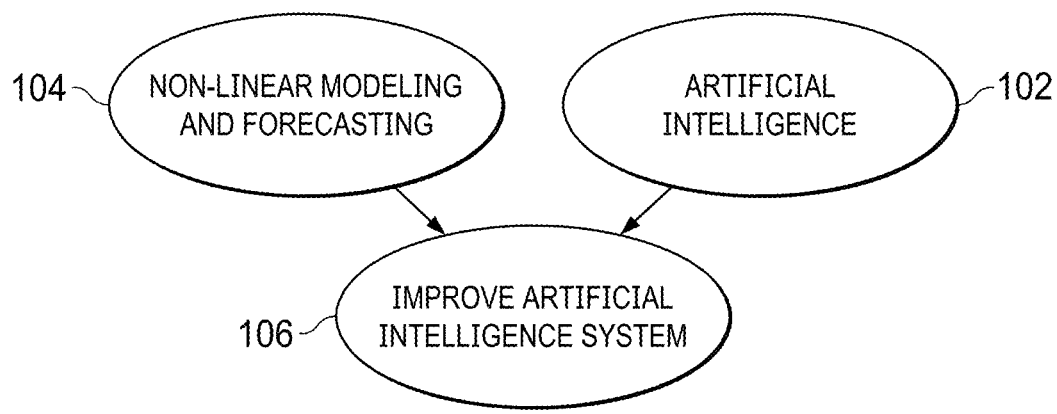
FIG. 1 illustrates a combination of nonlinear modeling and forecasting with an artificial intelligence system.

Referring now to the drawings, wherein like reference numbers are used herein to designate like elements throughout, the various views and embodiments of the unified nonlinear modeling approach for machine learning and artificial intelligence are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
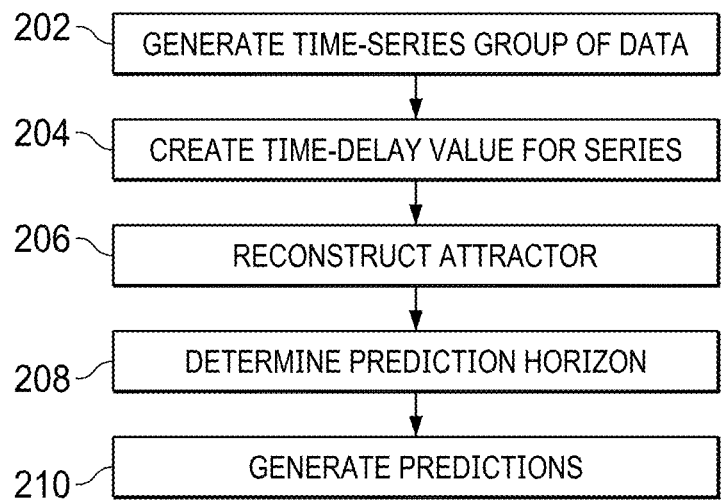
FIG. 2 illustrates a flow diagram of the process for nonlinear modeling and forecasting.

Referring now to the drawings, and more particularly to FIG. 1, there is illustrated the manner in which an artificial intelligence system 102 may be combined with a process for nonlinear modeling and forecasting 104 as described herein to provide an improved artificial intelligence system 106. FIG. 2 is a flow diagram illustrating the general process for nonlinear modeling and forecasting 104 that can be implemented within an artificial intelligence system 102. Initially, with respect to a group of data being analyzed, a time series group of the data is generated at step 202. A time series is a series of data points indexed in time order. Most commonly, a time series is a sequence taken at successive equally spaced points in time. Thus, it is a sequence of discrete-time data. Time series data has a natural temporal progression. Next, a delay value for the time series is created at step 204. Based upon the time series group of data and the created the attractor is reconstructed at step 206. A prediction horizon for the data set is determined at step 208.

An attractor is a set of numerical values toward which a system tends to evolve, for a wide variety of starting conditions of the system. System values that come close enough to the attractor values remain close even if slightly disturbed. In finite-dimensional systems, evolving variable may be represented algebraically as an n-dimensional vector. The attractor is a region in n-dimensional space in physical systems, the n-dimensions may be, for example, two or three positional coordinates for each one or more physical entity. If the evolving variable is two or three dimensional, the attractor of the dynamic process can be represented geometrically in two or three dimensions. An attractor can be a point, a finite set of points, a curve, a manifold or even a complicated set with a fractal structure known as a strange attractor. Describing the attractors of chaotic dynamical systems may be done in Chaos Theory.

A dynamical system is a system in which a function describes the time dependence of a point in a geometric space. Examples include the mathematical models describing the swinging of a clock pendulum, the flow of water in a pipe and the number of fish each spring in a lake. At any given time, a dynamical system has a state even by a tuple of real numbers (a vector) that can be represented by a point in an appropriate state space (a geometrical manifold). The evolution rule of the dynamical system is a function that describes what future states follow from the current state. Often the function is deterministic, that is, for a given time interval one future state follows from the current state. However, some systems are stochastic, in that random events also affect the evolution of the state variables. A trajectory of the dynamical system in the attractor does not have to satisfy any special constraints except for remaining on the attractor, forwarding time. This enables the attractor to be utilized for predictions. The trajectory may be periodic or chaotic. If a set of points is periodic or chaotic, with the flow in the neighborhood is away from the set, the set is not an attractor but instead called a repeller. From the attractor various predictions may be generated at step 210 in order to predict future behavior based upon the provided time series data. The process for nonlinear modeling and forecasting 104 utilized herein is more particularly described hereinbelow.

In the past, the modeling and forecasting of time series data that had nonlinear structure involved attempts to model the systems underlying physics. For example highly entangled dynamics in solar activity data was uncovered as disclosed in S. Ashrafi and L. Roszman, *Detecting and Disentangling Nonlinear Structure from Solar Flux Time Series,* 43rd Congress of the International Astronautical Federation, August 1992, which is incorporated herein by reference. This disclosure discovered that the general lack of predictability in solar activity data arises from its nonlinear nature as more fully discussed in S. Ashrafi and L. Roszman, "Evidence of Chaotic Pattern in SolarFlux Through a Reproducible Sequence of Period-Doubling-Type Bifurcations," *Proceedings of Flight] Mechanics/Estimation Theory.Symposium*, National Aeronautics and Space Administration, Goddard Space Flight Center, Greenbelt, Md., May 1991 and S. Ashrafi, *Combining Schatten's Solar Activity Prediction Model With a Chaotic Prediction Model*, National Aeronautics and Space Administration, Goddard Space Flight Center, Greenbelt, Md., 554-FDD-911125, November 1991, each of which are incorporated herein by reference in their entirety.

Figure 3:
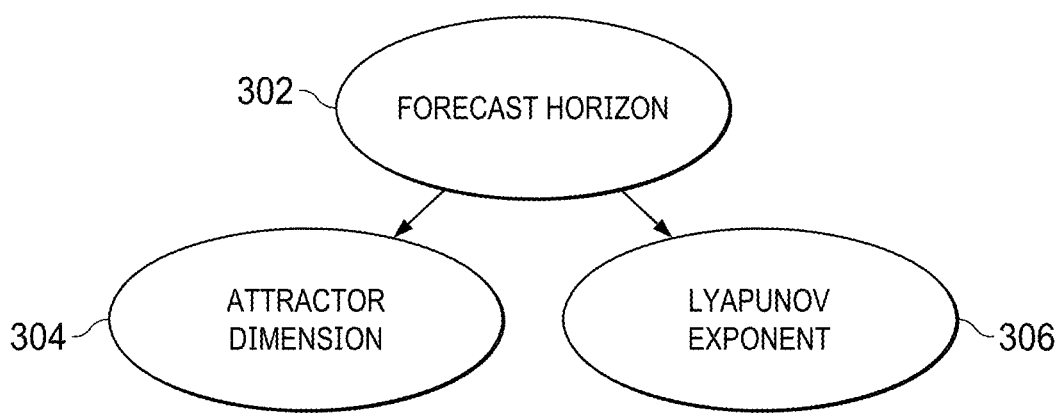
FIG. 3 illustrates a forecast horizon comprising a function of attractor dimensions and Lyapunov exponents.

Nonlinear dynamics allows the prediction of time series data more accurately than is possible using stochastic methods for time scales shorter than a characteristic horizon, and with about the same accuracy as using stochastic techniques when the forecasted data exceed this horizon. In some embodiments the horizon may be an Ashrafi Horizon as described in S. Ashrafi and L. Roszman, "Lyapunov Exponent of Solar Flux Time Series," *Proceedings of First Experimental Chaos Conference*, June 1991 and S. Ashrafi and L. Roszman, Solar Flux Forecasting Using Mutual Information with Optimal Delay, AAS 93-311, Spaceflight Dynamics 1993, American Astronautical Society Publication, Advances in the Astronautical Sciences, Volume 84 Part II pages 901-913, each of which are incorporated herein by reference. As shown in FIG. 3, the forecast horizon 302 is a function of two dynamical invariants: the attractor dimension 304 and the Lyapunov exponent 306 as shown in S. Ashrafi and L. Roszman "Nonlinear Techniques for Forecasting Solar Activity Directly From its Time Series," *Proceedings of Flight Mechanics/Estimation Theory Symposium*. National Aeronautics and Space Administration, Goddard Space Flight Center, Greenbelt, Md. May 21-23, 1992 which is incorporated herein by reference. The techniques introduced herein are applicable to any time series of data generated from any physical, social or economic system.

Estimation of the attractor dimension 304 reconstructed from a time series of data has become an important tool in data analysis. Many possible characterizations of dimension have been introduced. Grassberger and Procaccia have introduced the notion of correlation dimension, which has become a popular method for estimating the attractor dimension for low-dimensional systems. In calculating the invariants of the system, the first necessary step is the reconstruction of the attractor for the system from the time-delayed values of the time series as shown in F. Takens, "Detecting Strange Attractors in Turbulence," *In Lecture Notes in Mathematics*, Vol. 898, 366 Berlin: Springer-Verlag, 1981, which is incorporated herein by reference. The choice of the time delay is critical for this reconstruction.

For an infinite amount of noise-free data, the time delay can, in principle, be chosen almost arbitrarily. However, the quality of the phase portraits produced using the time-delay technique is determined by the value chosen for the delay time. Studies by Fraser and Swinney such as those described in A. M. Fraser and H. L. Swinney, *Phys. Rev. A*33, 1134, 1986, which is incorporated herein by reference, have shown that a good choice for this time delay is the one suggested by Shaw, in R. S. Shaw, The Dripping Faucet as a Model Chaotic System, Aerial Press, C A, 1985, which is incorporated herein by reference, which uses the first local minimum of the mutual information rather than the autocorrelation function to determine the time delay. A refinement of this criterion is described hereinbelow and applies the refined technique to a sample time series data (solar flux data) to produce a forecast of the solar activity. However, the technique may be applied to any time series data.

Referring now to FIG. 4 there is illustrated a process for enabling an artificial intelligence system to forecast future values of data based upon a past time series group of data. The time series data is received at 402 and using this various dynamical invariants may be extracted at step 404. Using the dynamical invariants phase-space representations of the time series data are constructed at step 406. Phase-space representations comprise a space representation in which all possible states of a system are represented, with each possible state corresponding to one unique point in the phase-space. The phase-space representations are used for forecasting future values of the data at step 408. Numerical techniques enable construction of the phase-space representations of the time series data so that the future values of the time series data can be forecasted directly from its past time series. This approach makes it possible to model the behavior of a system using an attractor created in terms of extracted dynamical invariants from the system's dynamics without reference to any underlying physics or dynamics of the data. The dynamical evolution of time series in this reconstructed phase-space that captures the properties of the attractor, give a procedure for extracting an optimal time delay using mutual information, and present preliminary predictions made for the magnitude and phase of a sample data (next maximum).

Nonlinear Structure in Systems

Until recently, there was little reason to doubt that weather in principle is predictable, given enough data. Recently, a striking discovery changed this view. Simple deterministic systems with only a few degrees of freedom can generate seemingly random behavior. When a system exhibits apparent random behavior that is fundamental to its dynamics such that no amount of information gathering will make the system predictable, the system is considered chaotic. For example, much evidence supports the assertion that solar flux falls in this category. Perhaps paradoxically, chaos is generated by fixed rules that do not themselves involve any element of chance. The future of a dynamic system is completely determined by present and past conditions. In practice, amplification of small initial uncertainties makes a system with short-term predictability unpredictable in the long term.

New developments in chaos and nonlinear dynamics allow the modeling of the behavior of a system in terms of some invariants directly extractable from the system's dynamics, without reference to any underlying physics. Using chaos theory, short-term activity can be predicted more accurately than with statistical methods. In addition, chaos theory imposes a fundamental limit on accurate long-term predictions.

Review of Chaotic Dynamics

Self-Organization and Attractors

To gain an understanding of some of the concepts underlying nonlinear dynamics, consider a simple pendulum. The pendulum exhibits two fundamental degrees of freedom: position and momentum. However, in its stable periodic state (referred to as a limit cycle), the pendulum exhibits only one degree of freedom, the phase angle. The dynamics of the system are attracted to a lower dimensional phase-space, and the dimension of this reduced phase-space is equal to the number of active degrees of freedom in the system. The trajectory of the pendulum in phase-space is called the attractor for the system. Attractors are not limited to zero dimension (fixed points in phase-space) or one dimension (limit cycles, like the simple pendulum). For nonlinear systems, attractors can have higher dimensions and, in some cases, even fractional dimensions. When the attractor for a system has a fractional dimension, the attractor is a fractal and is referred to as a strange attractor. For non-linear systems, a generated attractor has a dimension equal to the number of active degrees of freedom in the system and these attractors can have multiple dimensions and in some cases fractional dimensions.

Phase-Space Construction Directly from a Time Series

When confronted with a complicated physical system, an experimenter normally measures at regular and discrete intervals of time the value of some state variable (for example, records the time series $s(t_0)$, $s(t_1)$, $s(t_2)$, ..., with $s(t_i) \in \mathbb{R}$ and $t_i = t_0 + i\Delta t$. This comprises the creation of a time series sequence of data as mention above. From the observed time series, the experimenter attempts to infer something about the dynamics (for example, the physics) of the system. Because the time series is one-dimensional, it is an incomplete description of the system during its time evolution. Nevertheless, many features of the dynamics of the system can be inferred from the time series. Takens (F. Takens, "Detecting Strange Attractors in Turbulence," In *Lecture Notes in Mathematics*, Vol. 898, 366 Berlin: Springer-Verlag, 1981 which is incorporated herein by reference) and Packard et al. (N. Packard et al., "Geometry From a Time Series," *Phys. Rev. Lett.*, 45, 1980 which is incorporated herein by reference) have shown that for chaotic systems, the time series can be embedded into a higher dimensional space using time-delayed values of the series and thus recover the dynamics of the system. Vectors with components as:

$$X(t)=[s(t),s(t+\tau),s(t+2\tau),\ldots,s(t+(m-1)\tau)]^T$$

where τ (time delay) and m (the embedding dimension) are parameters of the embedding procedure. Here X(t) represents a more complete description of dynamics than s(t).

An embedding dimension of m>2D+1, where D is the fractal dimension of the attractor, almost always ensures the construction of the topology of the attractor (Takens' theorem). If unlimited, infinitely precise data are available, almost any delay time τ and embedding dimension m>D will work, at least in principle. However, choosing the optimal parameters for real data is a nontrivial process.

If T is too large, then the components s(t) and s(t+(m−1)τ) of the reconstructed vector will be effectively uncorrelated, which will cause inaccurate reconstruction of the attractor and thus inflate the estimated dimension of the system. On the other hand, if (m−1)τ is too small, then the components s(t), ..., s(t+(m−1)τ) will all be very nearly equal, and the reconstructed attractor will fall near a long diagonal line. Thus, if the time delay is too large then it will cause an inaccurate reconstructions of the attractor and inflate the estimated dimension of the system, but if the time delay is too small then the reconstructed attractor will fall near a diagonal line. Generally, τ (time delay) must not be less than some characteristic decorrelation time, and (m−1)τ must not be too much greater than this decorrelation time. One such characteristic of time is the local minima of the autocorrelation function. This criterion gives only the linear dependence of the function s(t) with s(t+τ). The system here is nonlinear. Therefore, the mutual information of the system is a better property to use to select the optimal delay because the mutual information is (roughly) a nonlinear analogue of the autocorrelation function. That is, the mutual information is a property that shows the general dependence of s(t+τ) on s(t) rather than its linear dependence.

As an example, after embedding the time series in a state space using the Ruelle-Takens-Packard delay coordinate technique, the induced nonlinear mapping is learned using a local approximation. This procedure enables short-term forecasting of the future behavior of the time series using information based only on past values. Farmer and Sidorowich (J. Fanner and J. Sidorowich, "Predicting Chaotic Time Series," *Phys. Rev. Letts.*, 59, 1987 which is incorporated herein by reference) have already developed the error estimate of such a technique:

$$E \approx Ce^{(m+1)KT}N^{(m+1)/D}$$

where E=normalized error of prediction (0≤E≥1, here 0 is perfect prediction and 1 is a prediction no better than average)
m=order of local approximation
K=Kolmogorov entropy
T=forecasting window
N=number of data points
D=dimension of the attractor
C=normalization constant Using the Fanner-Sidorowich relation, the prediction horizon T for the zeroth order of local approximation can be found at step 206. Any prediction above Tmax is no better than an average constant prediction, where $T_{max}$ is found using:

$$E(T_{max})=1$$

For m=0, K is the largest Lyapunov exponent λ. Therefore, $T_{max}$ can be calculated from:

$$e^{KT_{max}}N^{-1/D} \approx 1$$

which can be written as:

$$T_{max} \approx \frac{\ln(n)}{KD} \approx \frac{\ln(N)}{\lambda D}$$

Any prediction beyond the indicated horizon (Ashrafi-Conway Horizon) is no better than an average value. The connection between the local and the global Lyapunov exponents has recently been found by Abarbanel et al. (H. Abarbanel et al., "Lyapunov Exponents in Chaotic Systems," *Rev. Modern Phys. Letts.* (BJ, (in press) which is incorporated herein by reference) to be a power law of the form:

$$\lambda(1)=\lambda_G+c/l^\nu$$

where λ(1)=local Lyapunov exponent
l=length of observed data (observation window)
ν=a constant dependent to the dynamical system (0.5≤ν≤1.0)
c=a constant dependent to initial conditions of the system
$\lambda_G$=well-known global Lyapunov exponent
ω=frequency of data points Because any data set has a finite length, the Abarbanel-Kennel power law and Farmer-Sidorowich relation can be used to show that Tmax must have the form:

$$T_{max} \approx \frac{\ln(l\omega)}{(\lambda_g + c/l^\nu)D}$$

This equation shows that as l increases linearly, Tmax increases logarithmically (point of diminishing return).

Structure of the Forecasting Algorithm

Once the state space representation is known, the next goal is to fit a model to the data to generate predictions at step 210. Several methods can be used. The simplest method is to assume that the dynamics can be written as a map in the form:

$$X_{n+1}=M(X_n)$$

where the current state is Xn, and Xn+1 is a future state. Methods such as the polynomial method, rational approximation, radial basis functions, neural networks, and local approximations have all proven to be successful approaches to modeling. The local approximation technique is described here because it is the method used to structure the forecasting algorithm presented in this patent. A description of some of these modeling techniques is described below.

Local Approximation

The basic idea of this approach is to break up the domain of M into local neighborhoods and fit different parameters into each neighborhood. This fit is generally better than global approximation, especially for large data sets. Most global representations reach a point of diminishing return. At this point, adding more parameters or data gives only an incremental improvement in accuracy. After a certain point, adding more local neighborhoods is usually more efficient than adding more parameters and going to a higher order. With local approximation, it is possible to use a given functional representation efficiently. The key is to choose the local neighborhood size correctly, so that each neighborhood has just enough points to make the local parameter fit stable. Thus, adding more parameters or given data gives only an incremental improvement in accuracy so it is important to choose the local neighborhood size correctly when doing local approximation.

An example of local approximation is the first order, or nearest neighbor, approximation. This approach involves looking through the data set for the nearest neighbor to the current point and predicting the evolution of the state based on what the neighbor did at later times. This may also be described as establishing a sphere around a present point, where the sphere encompasses the nearest neighborhood points and the present point comprises the current point. Thus as illustrated in FIG. 5, to predict future occurrences such as tomorrow's solar flux or another recurring data pattern using local approximation to first order, it is necessary to search the historical record at step 502 and find the solar flux or other data pattern most similar to that of today at step 504. Tomorrow's solar flux or other data pattern should be the same as the neighboring pattern one day later may be determined at 506. This determined future pattern may be used to determine future data values at step 508 using an AI system, Referring now also to FIG. 6, first order approximation can sometimes be improved by finding more neighbors at step 602, generating predictions for each of the additional neighbors (spheres) at step 604 and merging their predictions at step 606, for example, by weighting according to distance from the current state. When the data is noisy, it is better to use a larger number of neighbors (spheres). This procedure can be improved by weighting the contributions of neighbors (spheres) according to their distance from the current state. The advantage of linear approximation is that the neighborhood size grows slowly with the embedding dimension. The order of approximation may depend on factors such as the choice of neighborhoods, the dimension, or peculiarities of the data set. For low-dimensional problems, a third order approximation is good enough.

Finding neighbors (spheres) in a multidimensional data set is time consuming when considering many points. A straightforward method is to compute the distance to each point when finding neighbors in a multidimensional data set, which takes approximately N steps for N points. This method can be reduced to roughly log N steps by organizing the data with a decision tree, such as a k–d tree. This approach has been taken for the models presented here.

To implement this approach, the parameters required for the reconstruction of the attractor (step 208) must be determined accurately. This determination will be discussed in the remainder of this section.

Choice of the Embedding Dimension d

In this section, the technique used to determine the correct value of the embedding dimension d from the scalar time series x(n), n=1, 2, . . . , $N_D$ will be covered. There must be enough data in the time series to remove concerns with statistical issues about numerical accuracy. Extrinsic noise in the data will be ignored for this analysis. By following Takens' phase-space attractor reconstruction technique for the time series, the dynamics of the system will be captured and embedded in phase-space. This procedure requires a correct choice of $\tau$ (time shift), which will be discussed in the next section.

Figure 7:
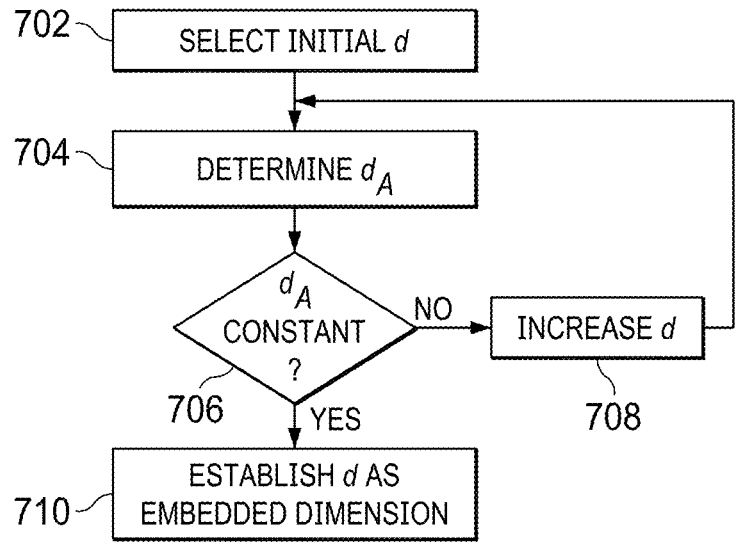
FIG. 7 illustrates a flow diagram of a process for establishing and embedding dimension.

Referring now to FIG. 7, there is illustrated a flow diagram of the process to establish an embedding dimension. To establish the embedding dimension d, a characteristic of the attractor that becomes unchanging as d becomes large is needed. This invariant characteristic of the attractor is the attractor dimension $d_A$. An initial value of d is selected at step 702 and an attractor dimension $d_A$ is determined at step 704. Inquiry step 706 determines if the attractor dimension is constant. If not, one increases d at step 708 until inquiry step 706 determines $d_A$ becomes constant and identifies the minimum d where $d_A$ "saturates" as the embedding dimension at step 710. Computation of $d_A$ is difficult, so the correlation function D(r) proposed by Grassberger and Procaccia in P. Grassberger and I. Procaccia, *Phys. Rev. Lett.* 50, 346, 1983, which is incorporated herein by reference is used for computing $d_A$. The correlation function is given by:

$$D(r, N, d) = \frac{2}{N(N-1)} \sum \sum U(r - \|X(j) - X(i)\|), i \neq j$$

where U(r) is the unit step function. For large values of N, the behavior of D (r, N, d) for r becomes independent of N and takes the form:

$$D(r,N,d) = \Phi(r,d) r^{v(d)}$$

By plotting D(r, N, d) versus r, the correct value of the dimension d can be singled out.

Choice of the Time Shift $\tau$

The optimal choice of $\tau$ has been discussed extensively in the literature such as J. H. Bentley, "Multidimensional Binary Search Trees in Data Base Applications," *IEEE Transactions on Software Engineering*, 5 (4), 1979, which is incorporated herein by reference. Previous studies of the solar activity set $\tau$ equal to the first local minimum of the autocorrelation function. The work of Fraser and Swinney suggests that a better criterion for the choice of the time delay is given by the first local minimum of the mutual information for the system. In this work, a modification of that criterion is used to forecast the sample time series.

Mutual Information

The autocorrelation function is given by:

$$R(\tau) = \int_{-\infty}^{\infty} f(t) f(t+\tau) dt$$

This function measures the linear dependence of the function $f$ (t) with the time-shifted function $f$ (t+$\tau$). Because the system under study here is nonlinear, the mutual information of the system is a better choice of functions if the optimal time delay is to be determined. The mutual information is a measure of the general dependence of the function with its time-shifted value, rather than a measure of the linear dependence. The mutual information between a time series Q and the time-shifted series S is given by:

$$I(S,Q) = 1(Q\ S) = H(Q) + H(S) - H(S,Q)$$

where H(Q) is the entropy of system Q, given by:

$$H(Q) = -\Sigma_i P_q(q_i) \log P_q(q_i)$$

and H(S,Q) is the joint entropy of systems S and Q, given by:

$$H(S,Q) = \Sigma_{ij} P_{sq}(S_i q_j) \log P_{sq}(S_i, q_i)$$

Pq and Psq in these equations are the probability densities for the corresponding states. The mutual information calculated in this manner gives a general measure of the independence of the time series S (the original time series shifted by the amount $\tau$) relative to the time series Q.

Computation of Mutual Information.

Figure 8:
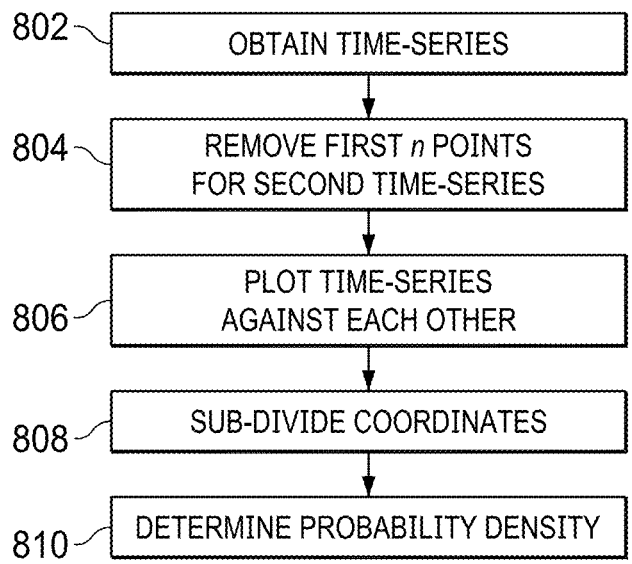
FIG. 8 illustrates a flow diagram for computing mutual information.

Because the mutual information is basically a sum of entropies, the probability density P for S, Q, and the joint system must be calculated. For a time series, this calculation cannot be performed analytically. An approximation to the calculation is possible following the prescription given in Fraser and Swinney. The procedure can be summarized as follows as shown in FIG. 8. Let Q be the original time series at step 802, and let $S_n$ be the series with the first n points removed at step 804. Plotting Q against $S_n$ at step 806 produces a curve in a two-dimensional space that is used in the calculation of I(S, Q). Because the time series has a finite number of elements, a finite number of points occurs in the space of the system. Now subdivide each coordinate in the space at step 808 so that the same number of points falls in each of the subdivided regions. Thus, if the time series has i elements, the Q-axis is divided at location $q_j$, chosen so that there are i/2 elements with q component greater than $q_j$, and i/2 elements with q component less than $q_j$. The $S_n$-axis is divided in a similar manner. When the system is divided in this manner, the probabilities P(Q) and P($S_n$) for the components q and $S_n$ of any point are the same for each region. This process simplifies the calculation of the mutual information because the only nontrivial probability density in the equation for I($S_n$, Q) is the mutual probability density, Psq.

Once the division of the coordinate axes has been accomplished as described above, the space of the two-dimensional system is divided into four regions. The probability that a randomly selected point in the system (but not in the original time series) will fall in region m of the space can be approximated at step 810 by:

$$P_m = \frac{n_m}{N}$$

where $n_m$ is the number of points from the time series that lie in region m, and N is the total number of points in the time series. This procedure can be repeated, dividing the regions into subregions, dividing the resulting subregions into sub-subregions, and so on, until the approximate probability density calculated using this technique becomes an accurate representation of the true probability density of the system.

Two cautions are in order here. First, the depth of the subdivisions must not be too shallow. If it is, then the resulting probability density will not accurately reflect the details of the true density. Second, if the subdivisions are made too often, the resulting probability density will pick up fluctuations arising from the discrete nature of the time series and will be bumpier than the true probability density. Thus, the criteria for halting subdivision of the regions must be handled carefully. The procedure taken here is to halt subdivision if the resulting subregions are equiprobable to within a specified tolerance. This tolerance is taken to be 20 percent as measured using a x-square test in this patent.

A Simple Model System

To test the effectiveness of the mutual information algorithm, several model systems have been analyzed. To illustrate the results, the Rossler system will be examined. The equations that describe a Rossler system are:

$$\frac{dx}{dt} = -y - z$$

$$\frac{dy}{dt} = x + 0.2y$$

$$\frac{dz}{dt} = 0.2 + xz - 5.7z$$

Figure 9:
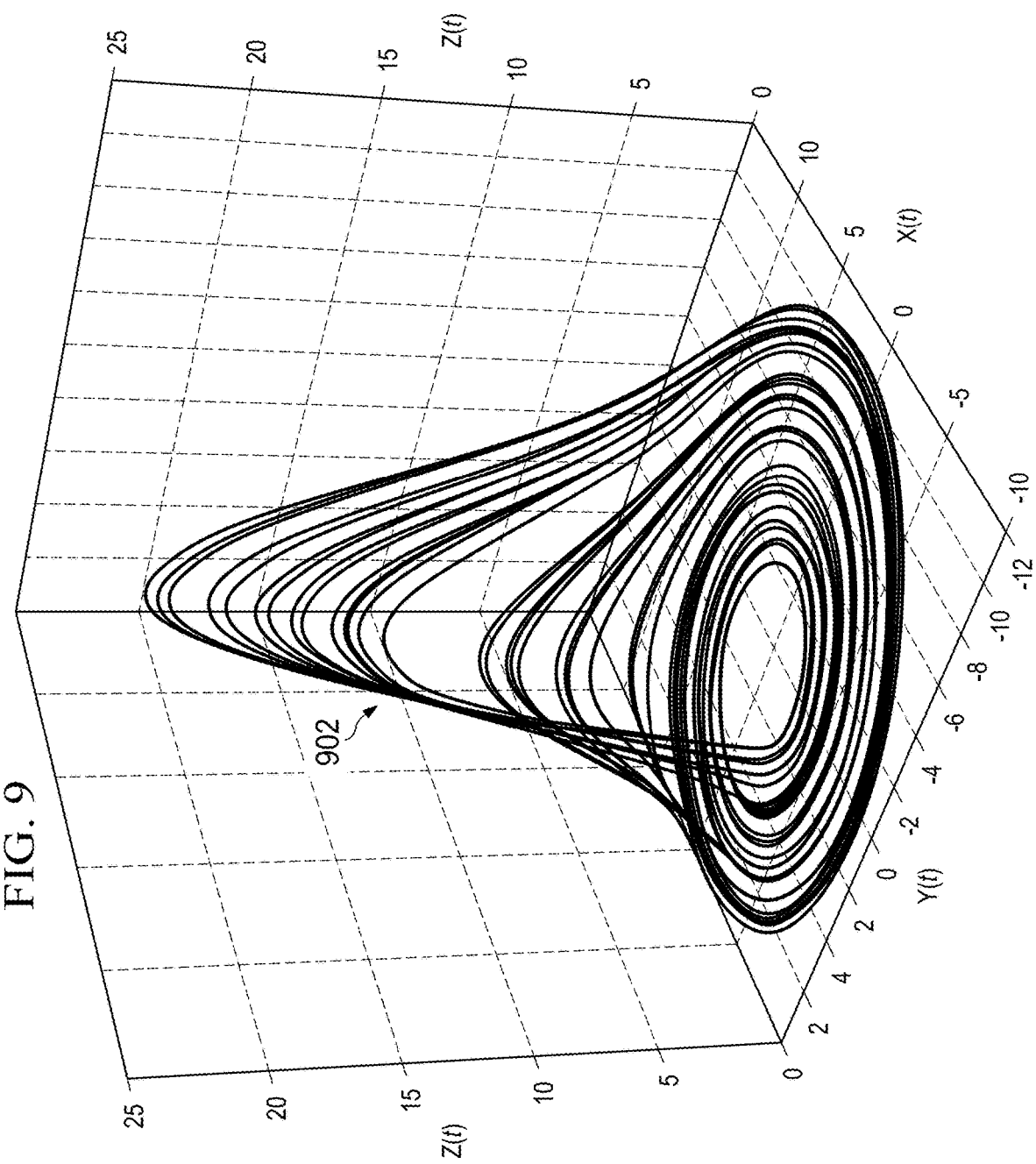
FIG. 9 illustrates a Rossler attractor.
Figure 10:
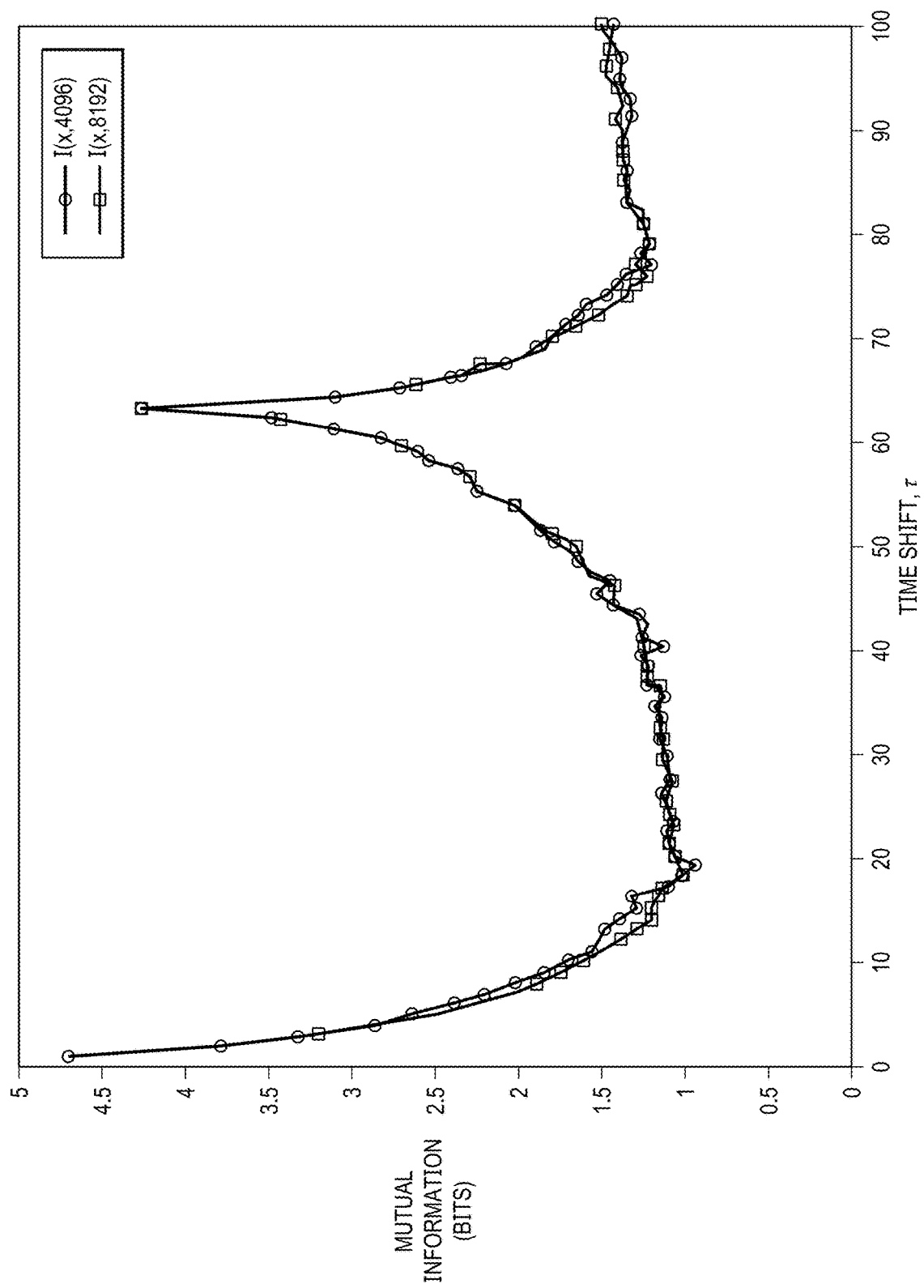
FIG. 10 illustrates mutual information for Rossler 4096 and 8192 points.

These equations have been integrated numerically using a fourth order Runge-Kutta algorithm with a fixed step size of $\Delta t=0.05$. The system produces the chaotic attractor 902 shown in FIG. 9 that is a Rossler Attractor. A Rossler system is a system of three non-linear ordinary differential equations originally studied by Otto Rossler. These differential equations define a continuous-time dynamical system that exhibits chaotic dynamics associated with the fractal properties of the attractor. An orbit within the attractor follows and out spirals close to the X, Y plane around an unstable fixed point. Once the graph spirals out enough, a second fixed point influences the graph, causing a rise in twist in the Z dimension. In the time domain, it becomes apparent that although each variable is oscillating within a fixed range of values, the oscillations are chaotic. This attractor has some similarities to the Lorenz attractor, but is simpler and has only one manifold. The data generated for the x, y, and z coordinates of the system have been treated as independent time series, and the resulting mutual information for these time series has been calculated using the algorithm described above. The mutual information for the x-coordinate as a function of the time shift is shown in FIG. 10. It illustrates mutual information for Rossler 4096 points 1002 and 8192 points 1004.

The Rossler system illustrates the features of good and bad choices of the time delay. The goal of the analysis of the mutual information is the selection of the time shift which given a time series, best reconstructs the attractor of the system using the Ruelle-Takens-Packard technique. The suggestion that the first local minimum of the mutual information produces the optimal time shift can be examined for this system. For convenience, consider the time series constructed from the x coordinate data for the system. As can be seen in FIG. 10, the first local minimum occurs at about t=32 steps–1.6 time units. (Note that minima that occur due to fluctuations arising from the discrete nature of the time series are omitted.) The time shift suggested is therefore $\tau=1.6$. Because the Rossler system is three-dimensional, this choice gives the location of the points on the reconstructed attractor as:

$$\vec{r_i} = [x(t_i), x(t_i+1.6), x(t_i+3.2)]^T$$

Figure 11:
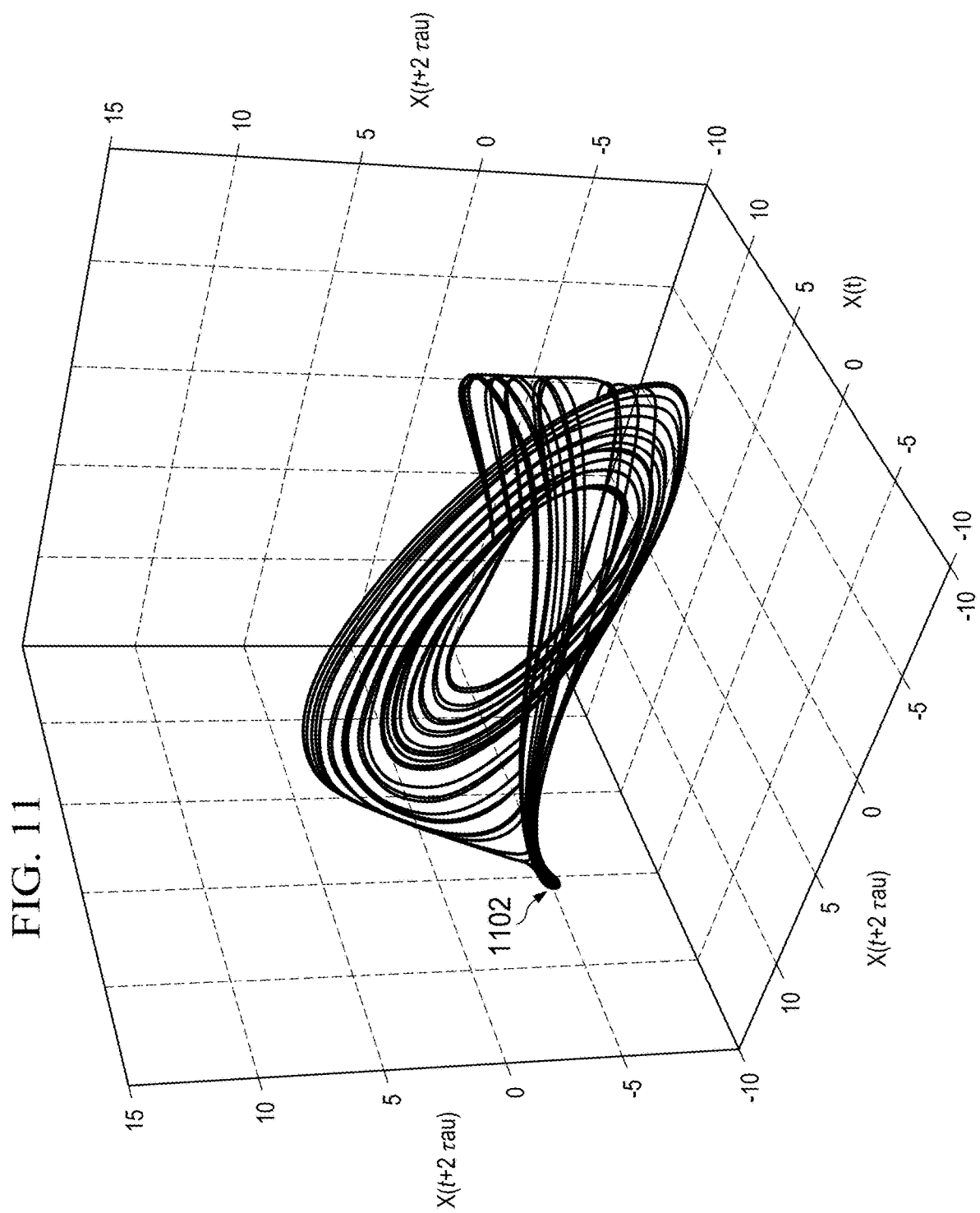
FIG. 11 illustrates a first embodiment of a reconstructed Rossler attractor.

When the resulting vectors are plotted in phase-space, the attractor does resemble the original system (see FIG. 11). Adjacent sections along the trajectory are spaced in the same way as on the original attractor. The time series does not contain information about the range of the y or z variables, so the actual orientation and scaling of the reconstructed attractor are different than for the actual system.

Figure 12:
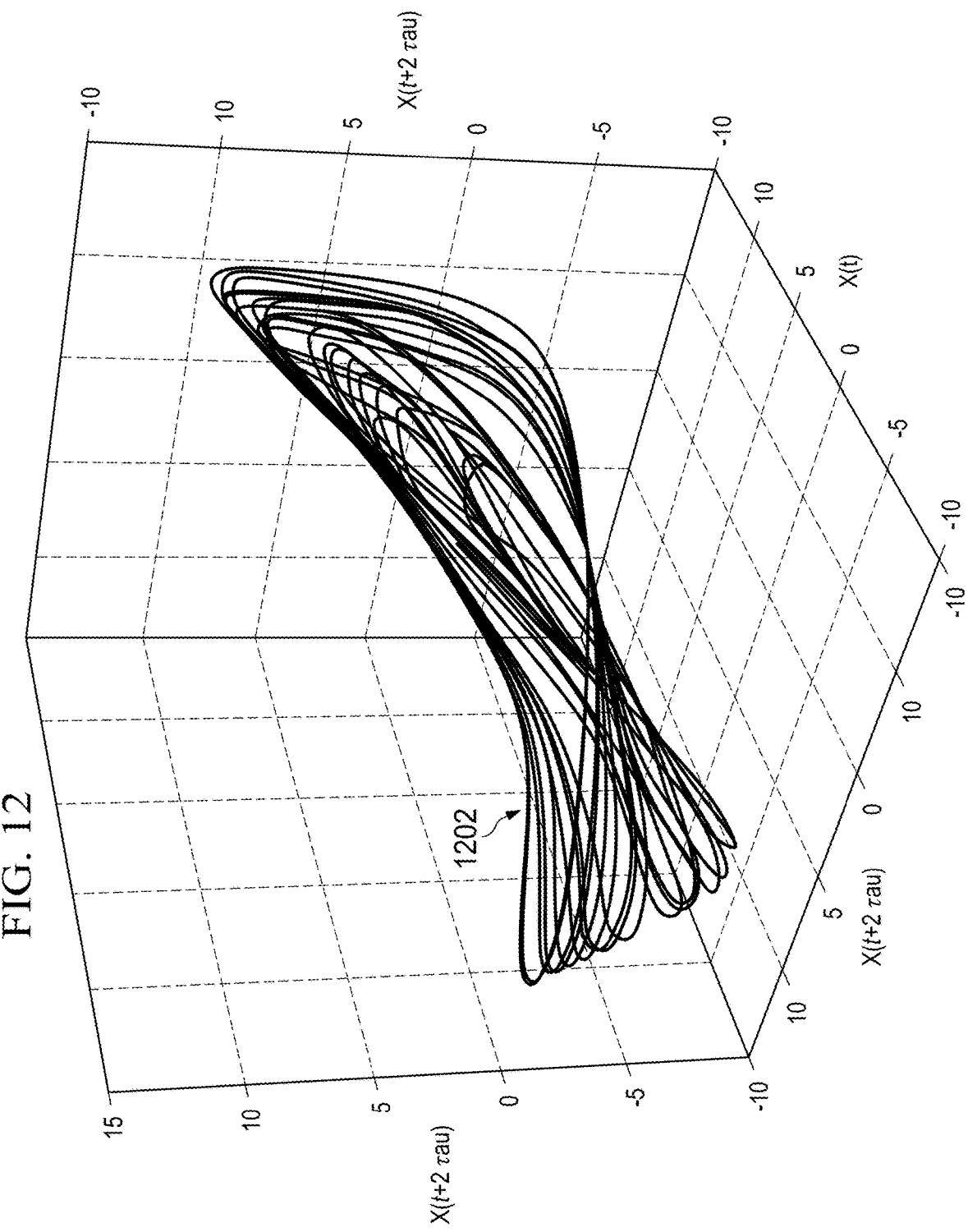
FIG. 12 illustrates a second embodiment of a reconstructed Rossler attractor.

For the purposes of prediction, the reconstructed attractor shown in FIG. 11 has one disturbing feature. For one specific region 1102 through which many trajectories pass (the cusp on the left side of the phase portrait), any prediction made across this region will be inaccurate. However, a better choice exists for the time delay than that made above. This better choice is seen by first examining a much worse choice. Suppose that the first local maximum of the mutual information is chosen for the time shift, so that $\tau=3.15$. The reconstructed attractor 1202 for this choice is shown in FIG. 12. This reconstructed attractor 1202 does not preserve even the appearance of the original attractor 902. This difference is explained by considering what the mutual information tells about the system. The mutual information is a measure of the dependence of the system with the time delayed version of itself. For reconstruction, the reconstructed axes should be as orthogonal to one another as possible. This pseudo-orthogonality produces the optimal spread in the trajectory of the attractor and, therefore, the best reconstruction for forecasting the system. The problem with the reconstruction 1202 based on $\tau=1.6$ is that the $(t+2\tau)$-axis hits near the first local maximum of the mutual information and is, therefore, far from satisfying the pseudo-orthogonality criterion. In this work, the axes are made pseudo-orthogonal by finding the time shift $\tau$ that minimizes the murual information at each of the time-shifted values of $\tau$. That is, the optimal choice of the time shift for a d-dimension system is found by minimizing:

$$I_t = \sum_{j=1}^{d-1} I(\tau_j)$$

Figure 13:
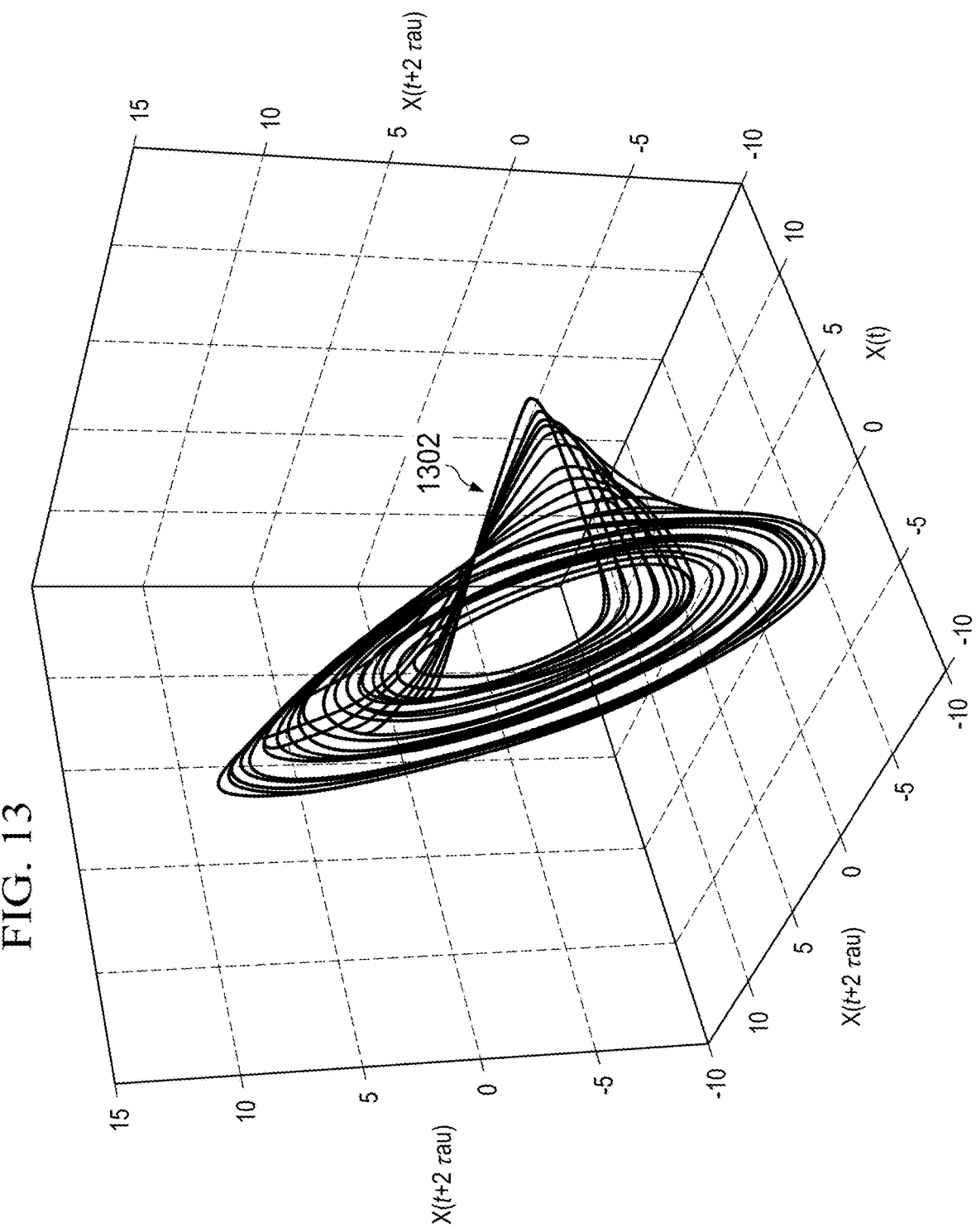
FIG. 13 illustrates a third embodiment of a reconstructed Rossler attractor.
Figure 14:
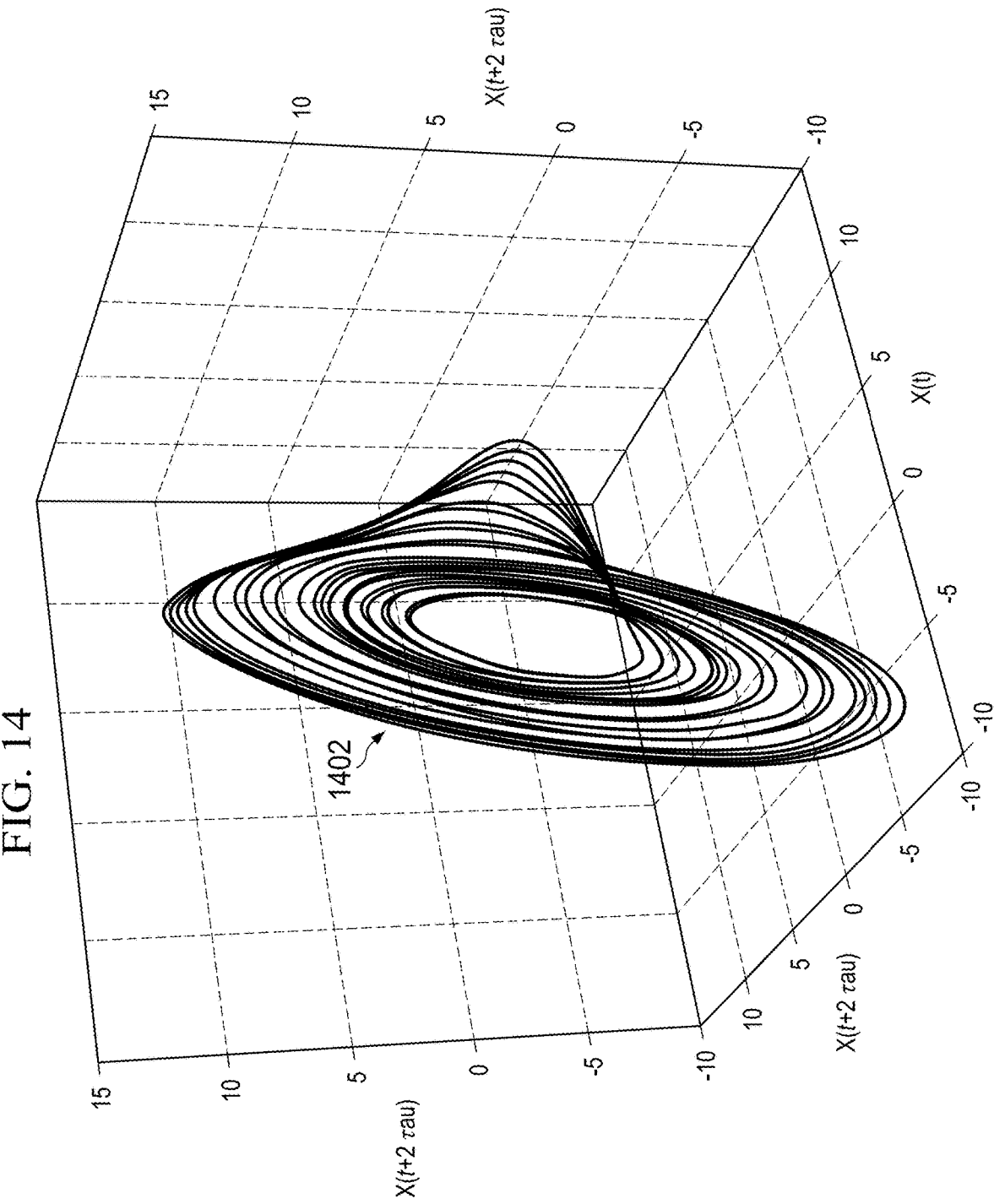
FIG. 14 illustrates a fourth embodiment of a reconstructed Rossler attractor.

For the Rossler system, this minimization indicates that a time delay of $\tau \approx 0.85$ should be used when reconstructing the attractor. The resulting system is shown in FIG. 13. For comparison, the reconstruction 1402 using a time delay of $\tau=0.40$ is shown in FIG. 14. The optimal reconstruction 1302 shows the best spread of the trajectories possible given the limitations of the time series data. Therefore, it is this optimization criterion that must be applied to the time series for the solar flux data to produce the best reconstructed attractor on which to forecast.

Preliminary Forecasts of the Solar Flux or Other Data

Figure 15:
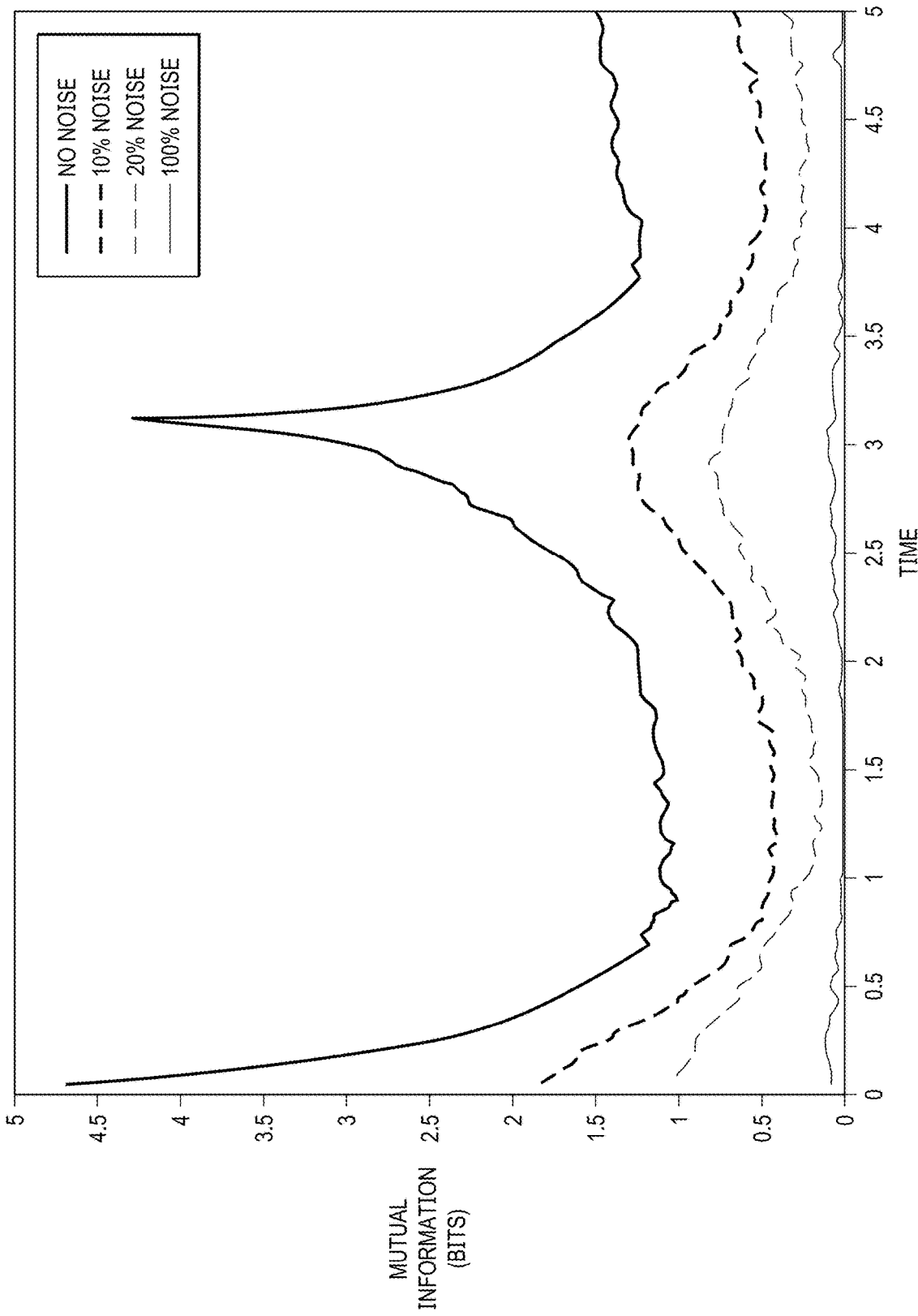
FIG. 15 illustrates mutual information of a Rossler attractor with noise.

Solar flux or other data is not noise free. The goal of this work is to determine the optimal time shift for the reconstruction of the attractor for the solar flux or other data. Because the criterion chosen for the determination of this time shift depends on the mutual information, the effects of noise on the mutual information should be examined. FIG. 15 shows the effect of additive noise on the mutual information for the Rossler system. The extremas of the mutual information remain fixed in position but are reduced in amplitude. The optimal time shift calculated from this mutual information function is identical to that calculated for the noise-free system.

The techniques described herein have been used to produce preliminary forecasts for the behavior of $F_{10.7}$, but they can be used for any time series data. To produce forecasts that extend reasonably far into the future, it was necessary to build a time series that represents $F_{10.7}$ measured approximately once a month. However, because the resulting time series should represent the actual features of the data, rather than reflect the artificial constraints imposed by the calendar, the procedure described below was used.

Figure 16:
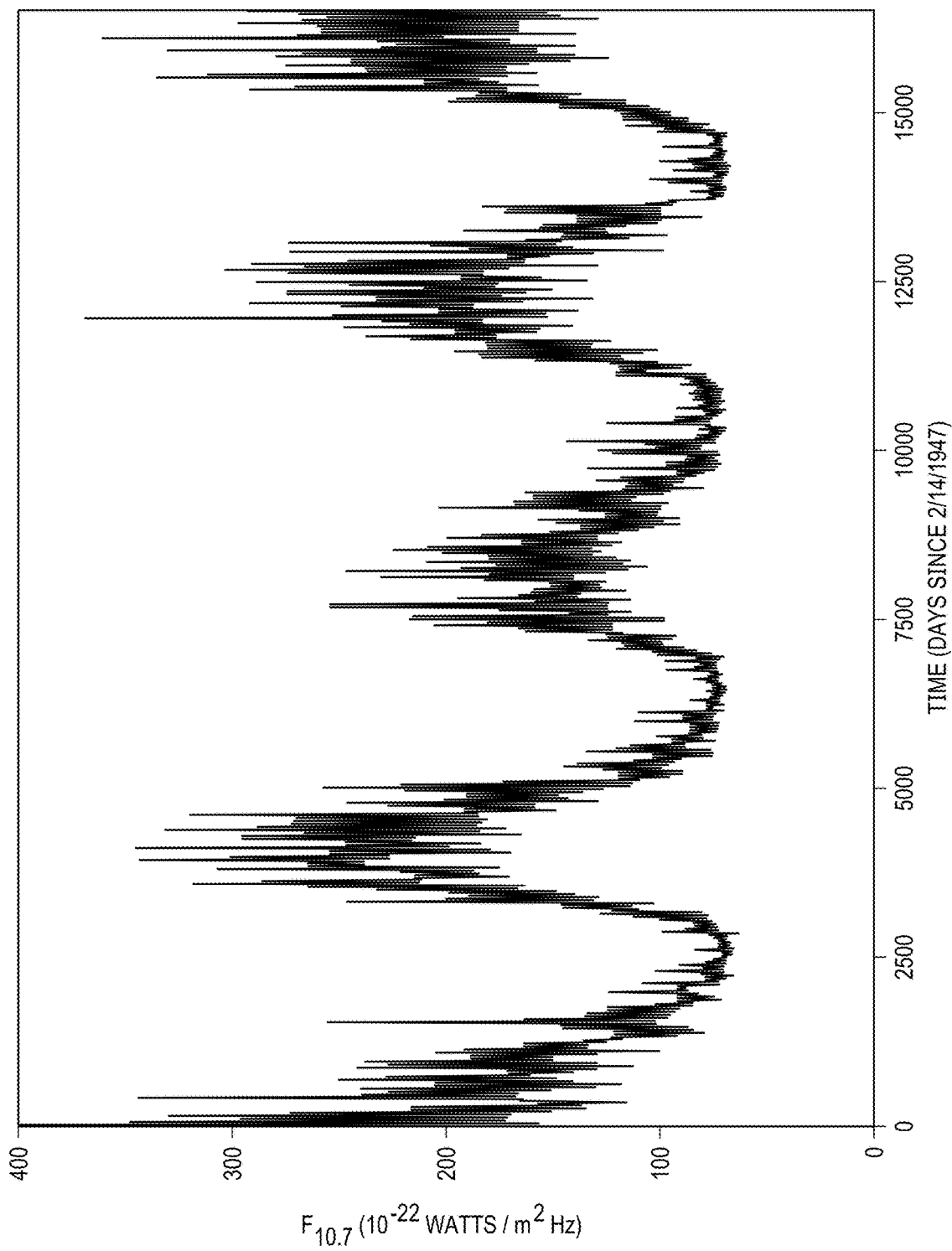
FIG. 16 illustrates a daily solar flux time series.
Figure 17:
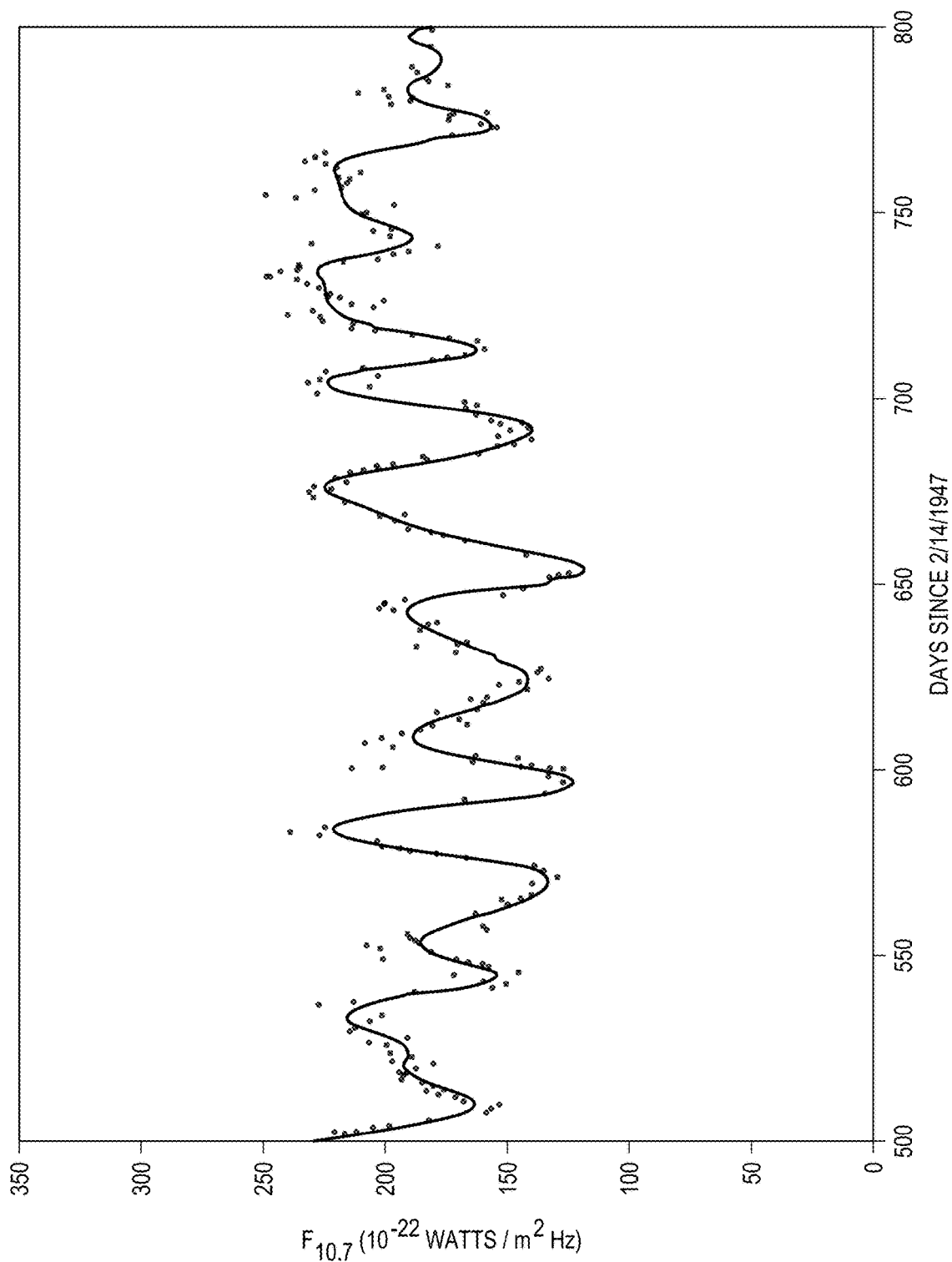
FIG. 17 illustrates filtered and unfiltered daily solar flux.
Figure 18:
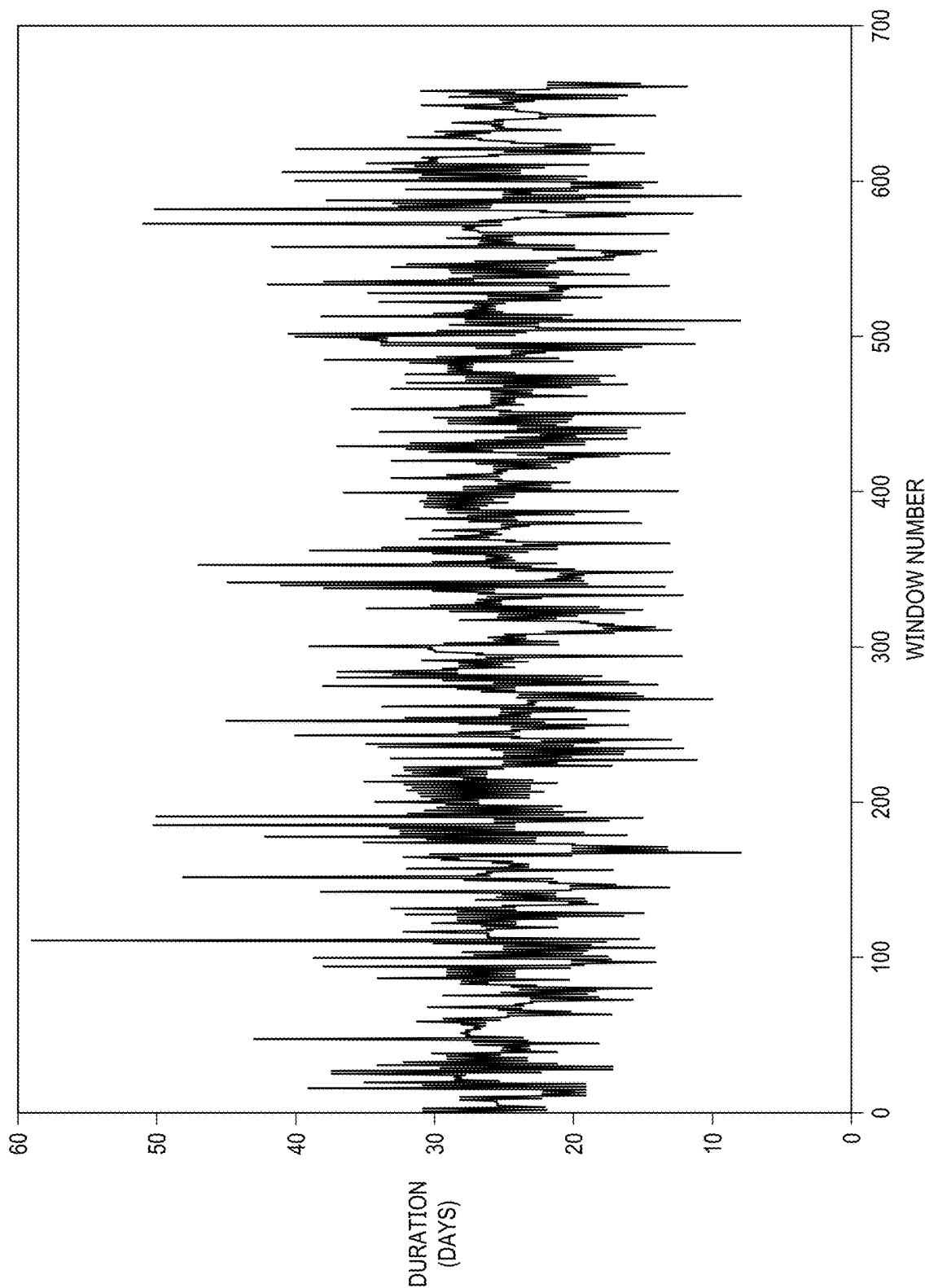
FIG. 18 illustrates variations of the period between minimas.
Figure 19:
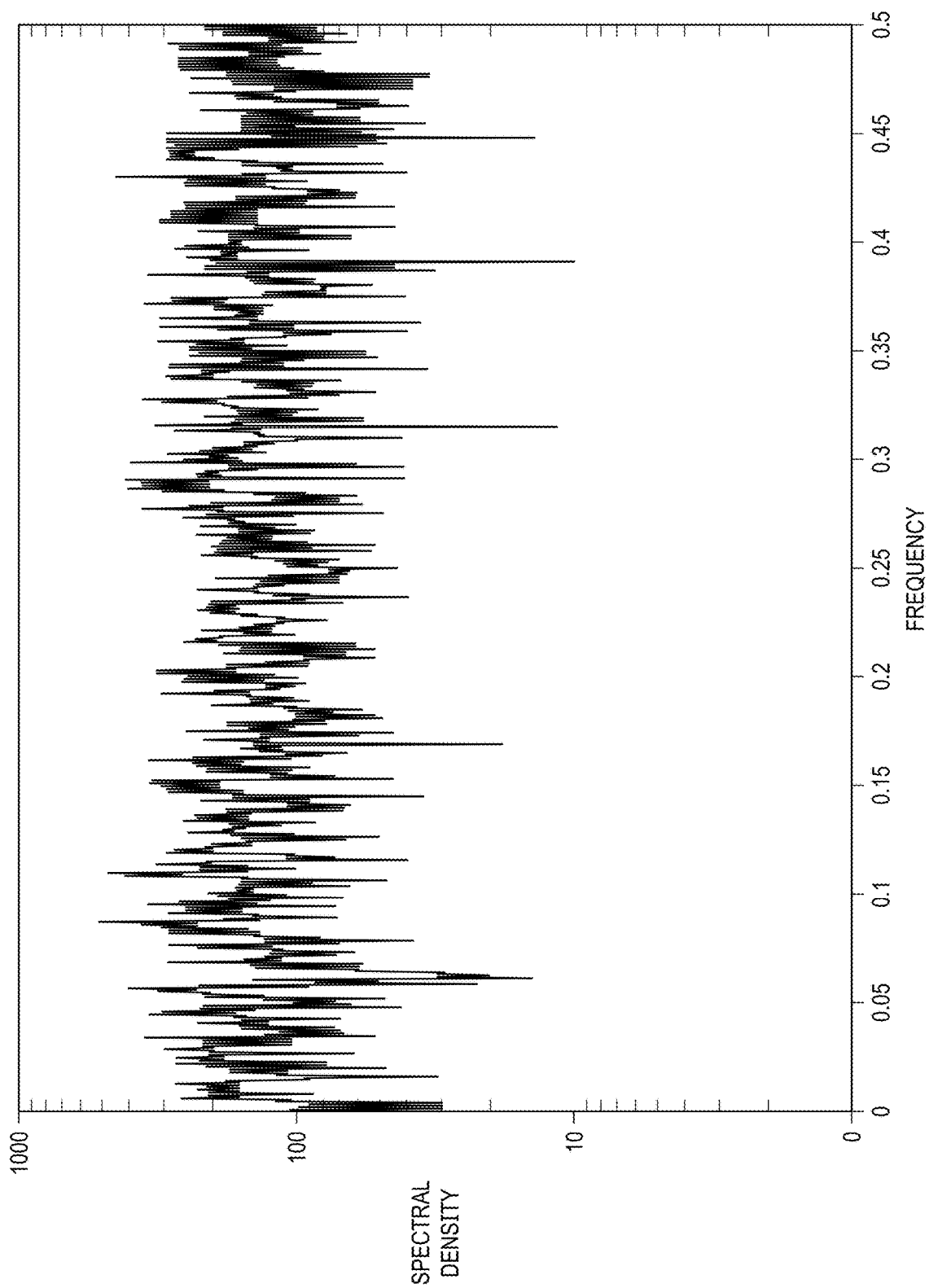
FIG. 19 illustrates the power spectrum of variations between minimas.
Figure 20:
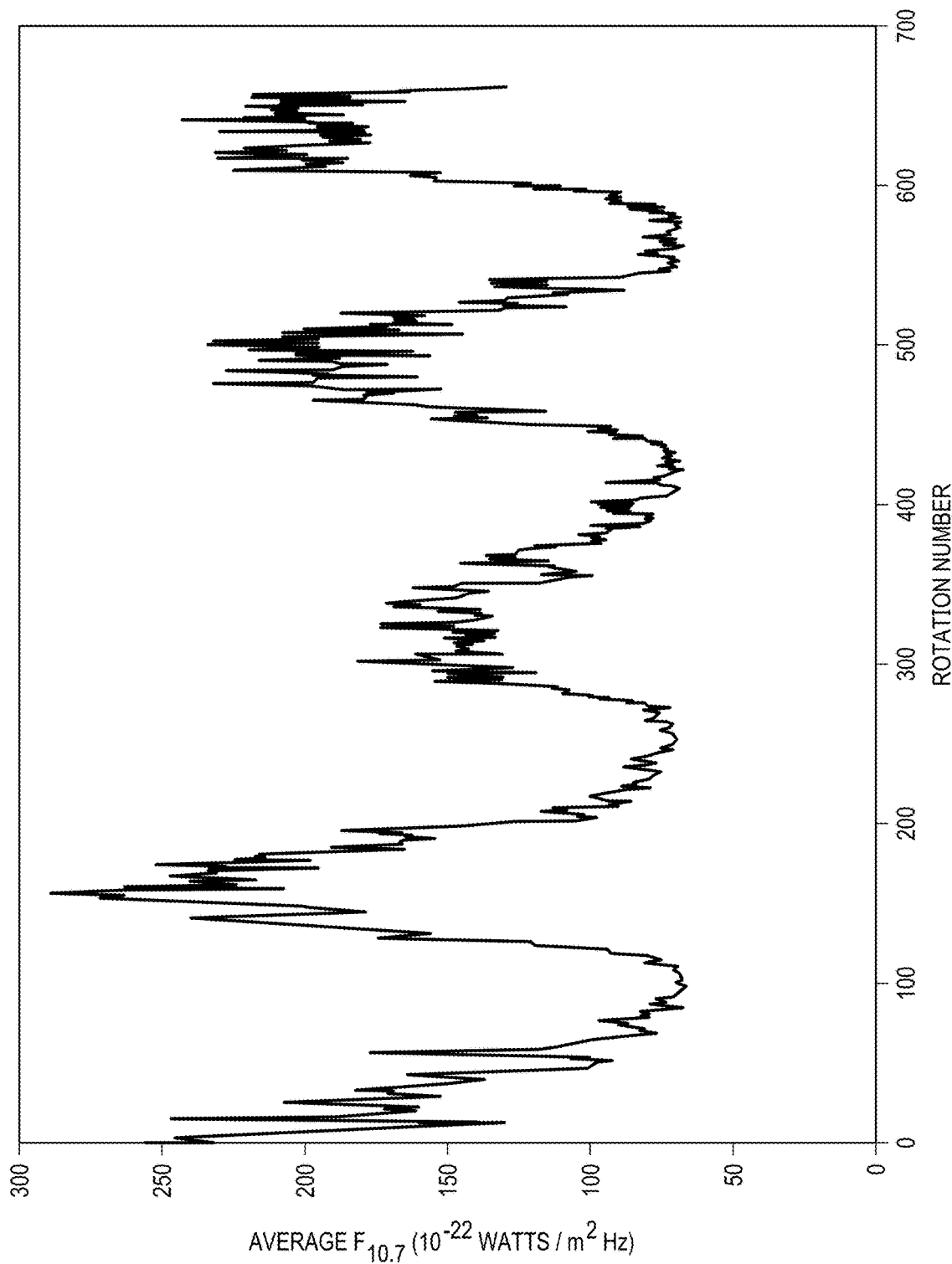
FIG. 20 illustrates solar flux averaged over solar rotations.

The daily solar flux is shown in FIG. 16. The data for the flux have been smoothed using Fourier techniques, and the results of this smoothing are shown in FIG. 17. One interesting feature of the resulting time series is the location of the extremas for the data. The minimas and maximas do not occur periodically. The phasing of the extremas is an important feature of the data, and it is the most difficult feature to forecast using nonlinear dynamics. This feature can be seen by examining the period between the minimas for the data. FIG. 18 shows the variation in the timing of the extremas. If these data are used to calculate the power spectrum of the phasing, then the amplitude is nearly uniform at all frequencies (FIG. 19). This case corresponds to a large Lyapunov exponent for the system, which means that the system is much more stochastic than can be handled using nonlinear techniques. Nevertheless, the amplitude of $F_{10.7}$ can be effectively forecast because the corresponding Lyapunov exponent is small and positive. The "monthly" time series is then constructed by taking the daily data and averaging it between the minimas of the series. The average period of the minimas is found to be about 24.8 days; this period is used to set the time scale for the data. The resulting time series is shown in FIG. 20. Thus, if the Lyapunov exponent is less than zero, the system is considered deterministic, if the Lyapunov exponent is greater than zero but less than one, the system is chaotic, and if the Lyapunov exponent is anything greater than one the system is stochastic.

Figure 21:
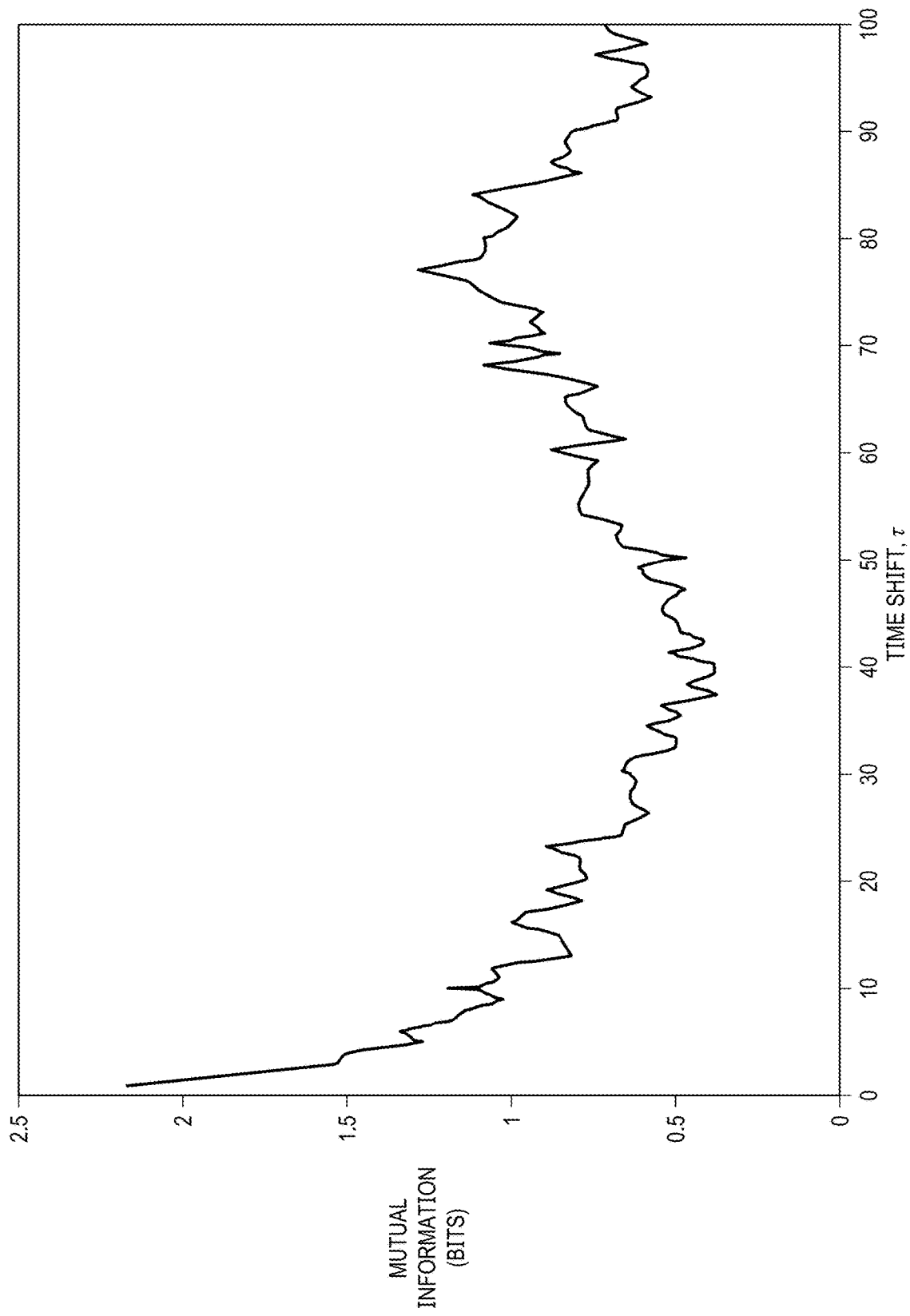
FIG. 21 illustrates mutual information of averaged flux.
Figure 22:
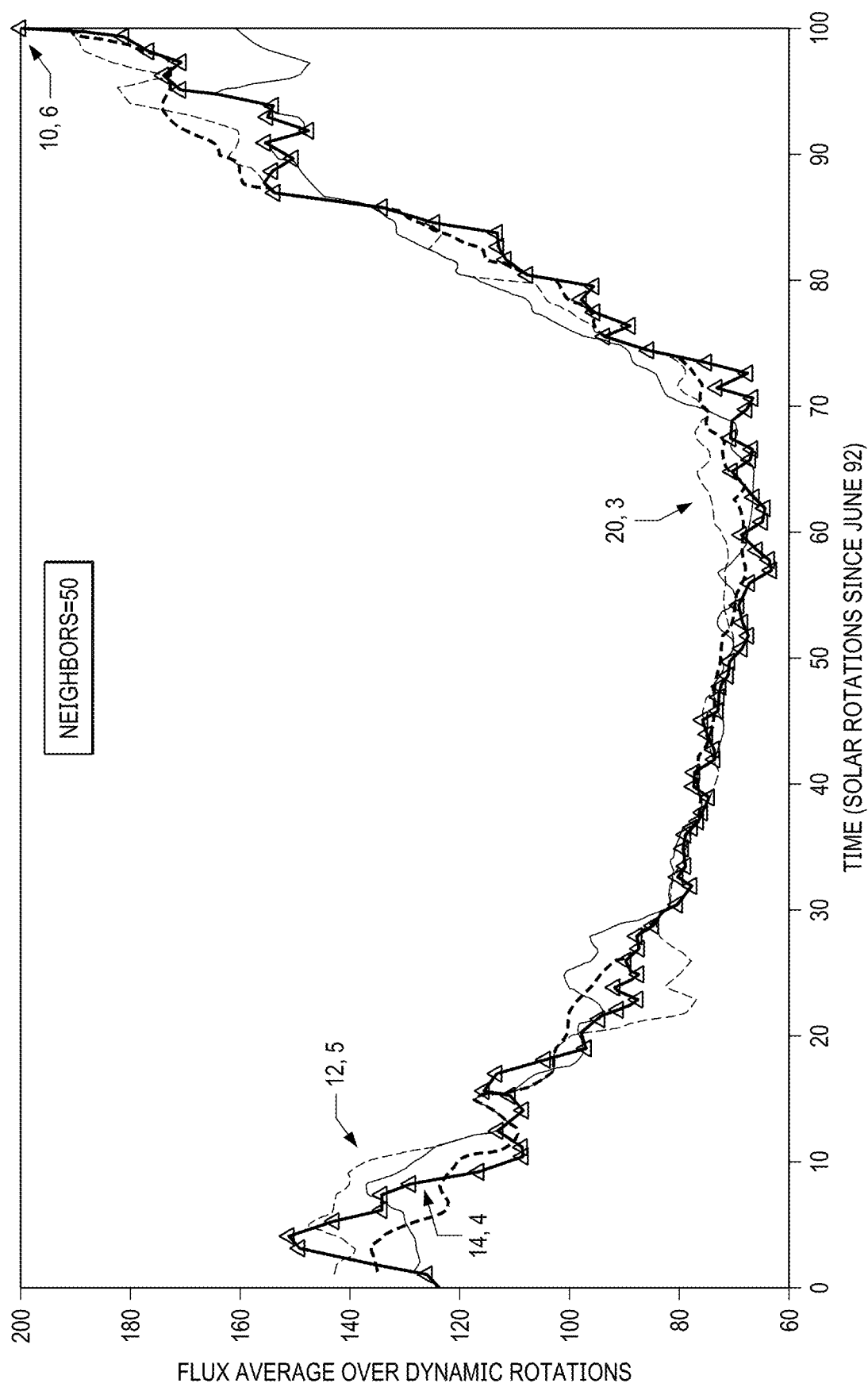
FIG. 22 illustrates a preliminary solar flux forecast.

The mutual information for the monthly time series is shown in FIG. 21. The function is not as smooth as those presented earlier because the time series is not as large as that used for the Rossler system, so that statistical fluctuations become more apparent. The optimal time shift can be calculated for this system given the embedding dimension of the attractor. The attractor can then be reconstructed, and forecasts of the behavior of $F_{10.7}$ can be made. These forecasts are shown in FIG. 22 for several different dimensions. The predictions made so far have several deficiencies. The time scale is in terms of periods of $F_{10.7}$ which has averaged about 24.8 days over the past 40 years. This period fluctuates from as little as 10 days to as much as 60 days (see FIG. 18) and, therefore, produces uncertainty in the time scale of the predictions. The dimension and Lyapunov exponent for F10.7 have not yet been calculated. These data are needed to develop the time horizon for our predictions. All of these parameters must be computed in order to fine-tune the predictions made using these techniques.

The data set used for the forecasts covers four solar cycles. A larger data set is needed to enhance the large time scale forecasting capabilities of our method. These data should allow forecasts of the solar cycle using nonlinear dynamics.

Any time series that has an inherent pattern can be forecasted using the techniques described herein above. The above example illustrates using a complicated time series as a sample data (i.e. Solar Activity). Using the described techniques, the complicated physical models are bypassed and the future forecasted directly from past observation. In other words, the nuclear, thermodynamics, electromagnetic flux of sun spots, mechanical rotation, fluid dynamic models of the sun are bypassed and reconstructed a new model reconstructed that bypasses all these factors and use solar radio waves to forecast its future behavior. These techniques may also be applied to other data sets. Examples of these types of datasets include forecasting electrical power demands, modeling glucose dynamics, modeling and forecasting for Artificial Intelligence, modeling and forecasting of social data and graphs, modeling and forecasting of financial and economic data and modeling and forecasting of all systems that have time series data. Various examples of these are discussed more fully hereinbelow.

Prediction Using FPGA-Based AI or Artificial Neural Network

The above described technique is for the generation of an actuator for prediction of future behavior may be implemented within a field programmable gate array (FPGA) that performs the above described process in near real-time applications. By implementing the prediction techniques within an artificial intelligence implemented on an FPGA, future predictive behavior may be made by the AI based upon data that is currently being input in order to create the attractor for predicting the behavior in a near real-time manner.

Chaotic oscillators generate chaotic time series that can be highly unpredictable, and which unpredictability can be quantified by determining their maximum Lyapunov exponent. Chaotic time series having high Lyapunov exponent values are more complex than chaotic time series having low values and therefore, when performing time series prediction of these kinds of signals, it becomes quite difficult to perform a long-term prediction. One can perform time series prediction of chaotic signals with different values of Lyapunov exponent by using an artificial neural network or artificial intelligence that is implemented in a field-programmable gate array (FPGA) as shown generally in FIG. 23.

Selection of hidden neurons, training algorithm, and architecture are critical to implementation of such a system within an FPGA. For instance, hidden neurons influence the error on the nodes to which their output is connected, and the accuracy of training is determined by the architecture, number of hidden neurons in hidden layer, kind of activation function, inputs, and updating of weights.

Figure 23:
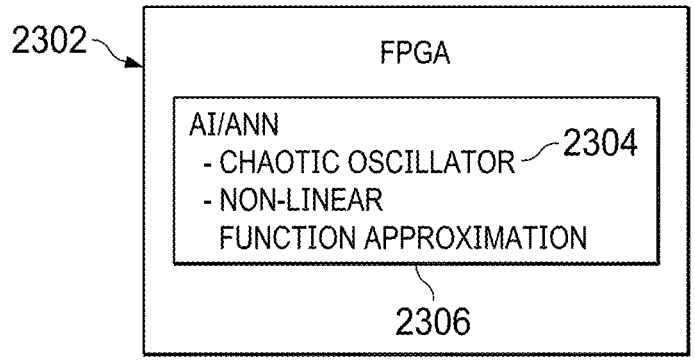
FIG. 23 illustrates an artificial neural network/AI implemented within a field programmable gate array (FPGA)

A chaotic time series may be generated in the following manner. A time series represents a measure of a physical variable $x_t$ registered at a time t, and it is discrete. The observed data can be used to model or to predict future values to determine the behavior of a time series. As shown in FIG. 23, a chaotic time series can be generated by implementing into an FPGA 2302 the chaotic oscillator 2304 described in say Rossler attractor, where x, y and z are state variables, and a, b, c, are real and positive coefficients. The chaotic oscillator 2304 would be implemented through a Artificial Intelligence or Artificial Neural Network 2306 within the FPGA 2302. The nonlinear function g(x) 2308 can be approached by piecewise-linear (PWL) functions.

Based on the approach introduced herein above an artificial neural network 2306 can be used taking advantage of their ability to approximate any nonlinear function. In addition, artificial neural network 2306 is characterized by fault tolerance, adaptivity, generalization, etc. Due to these characteristics, an artificial neural network 2306 is suitable for time series prediction, and we can implement it by using an FPGA 2302 due to its advantages for fast prototyping, configurability, reprogrammability, and low development and acquisition costs.

Figure 24:
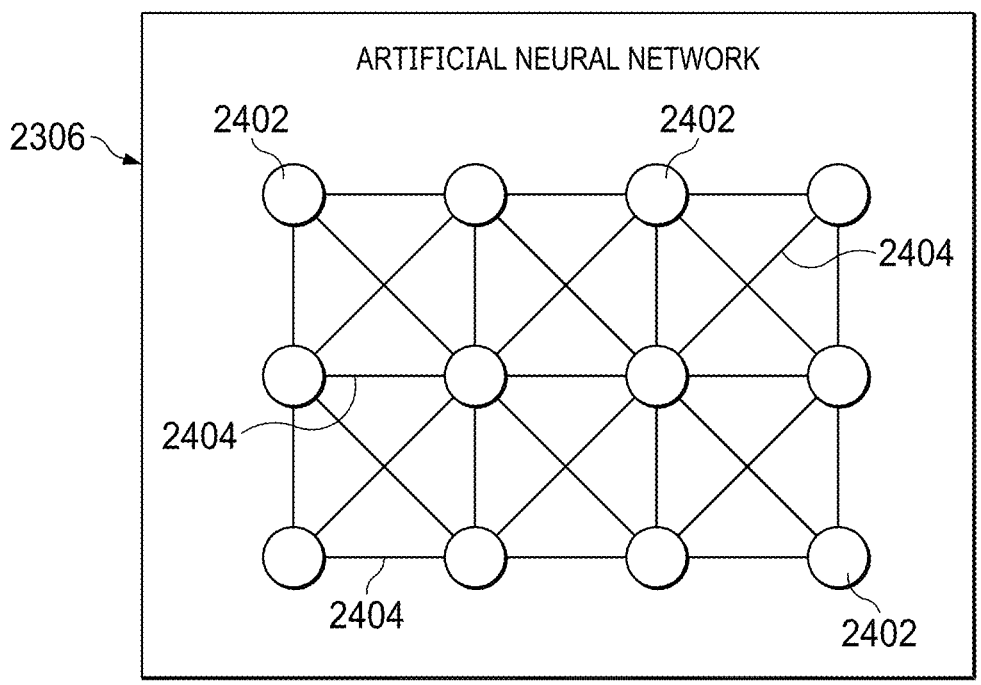
FIG. 24 illustrates an artificial neural network.

Referring now also to FIG. 24, an artificial neural network 2306 has elementary processing units called neurons or nodes 2402 whose processing capability is stored in the connections 2404 by synaptic weights, and whose adaptation depends on learning. Basically, there are three kinds of neurons: input neurons (that are used to allocate input values), hidden neurons (that are used to perform operations and consists of one or more layers), and output neurons (that are used to perform operations and to compare the values with target or reference ones). Where $x_j$ represents the input signals, w represents the synaptic weights (if w is positive it is associated to an excitation, if it is negative to an inhibition), b is the bias and f denotes the activation function that defines the output of the neuron.

Figure 25:
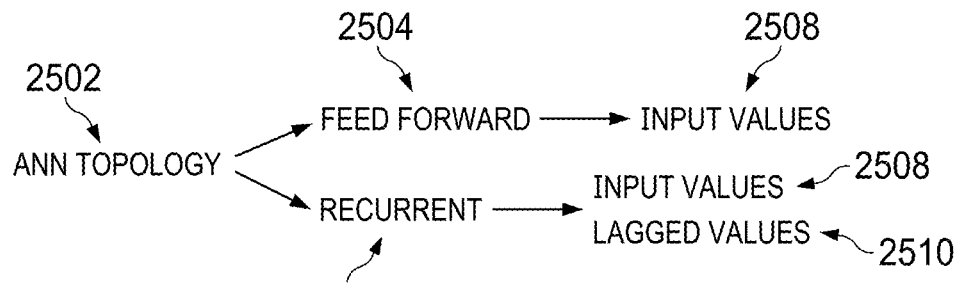
FIG. 25 illustrates the feedforward and recurrent topologies that may be associated with an artificial neural network.

Referring now to FIG. 25, among all types of artificial neural networks 2306, one can identify two major types of network topology 2502, namely: feedforward topology 2504 and recurrent topology 2506. A feedforward artificial neural network 2504 processes information in one direction, so that the prediction datum in y[k+1] depends only on the input values y[t] 2508 and cannot capture possible dependencies of y[k+1] on earlier values of y. A recurrent artificial neural network 2506 allows the neurons to depend not only on the input variables y[t] 2508, but also on their own lagged values 2510. Therefore, this kind of network builds a memory in the evolution of the neurons 2402. However, there is not a recipe on how many delay lines are required at the input layer to perform a good prediction.

Before implementing an artificial neural network 2306 into an FPGA 2302, one needs to train the topology for which a learning technique must be selected to adjust the parameters during the training processes. The learning technique can be supervised or unsupervised. The former does not involve competition, but it uses an external agent (actual output) for each input pattern that guides the learning process, in this case there is a teacher to provide feedback information. The unsupervised learning does not need a teacher to provide feedback for the information. In this case, the network discovers by itself patterns, features, regularities, correlations, or categories in the input data and code for them in the output.

Figure 26:
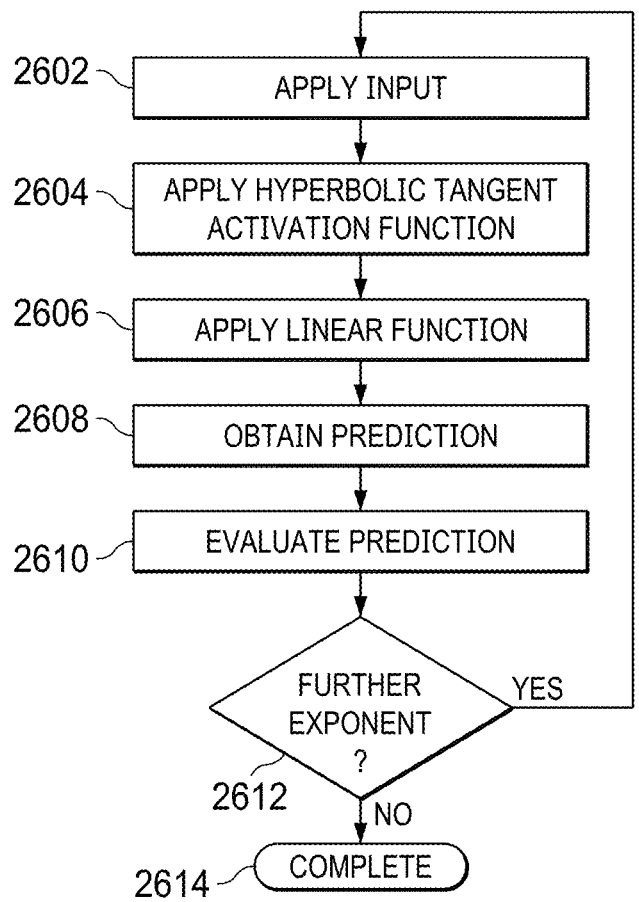
FIG. 26 illustrates a flow diagram of the process for training an artificial neural network.

As an example shown in FIG. 26, a feedforward artificial neural network can be trained using experimental data of the chaotic time series with different Lyapunov exponents. For the first five layers from the input at step 2602, a hyperbolic tangent activation function is applied at 2604 that can be implemented in digital hardware, and for the output layer a linear function is applied at 2606. The learning technique can be supervised and the weights for the input neurons can have a time delay line (y[k−1] . . . y[k−d]) to provide a finite dynamic response for the time series data at 2608. In this way, we can add tapped delay lines to perform better predictions. The prediction can be evaluated by measuring the MSE and RMSE at step 2610. Inquiry step 2612 determines if further Lyapunov exponents for the data exist for evaluation and if so, returns to step 2602 for processing with the further exponent. If no further exponents exist, the process is completed at 2614.

Schools of Machine Learning and Artificial Intelligence (AI)

Figure 27:
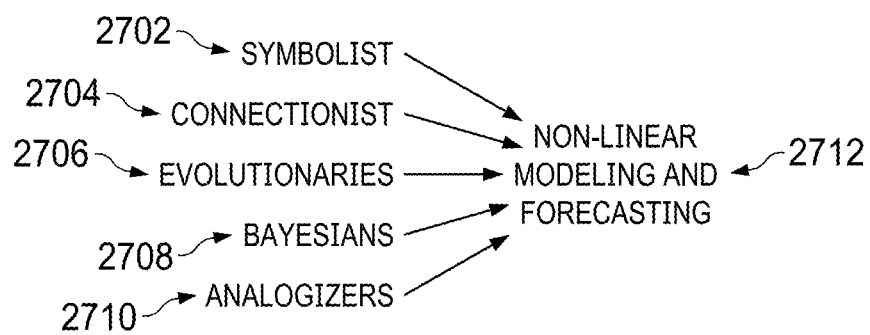
FIG. 27 illustrates various schools of machine learning.

Historically, there have been five schools of machine learning in industry. These schools include Symbolists 2702, Connectionists 2704, Evolutionaries 2706, Bayesians 2708, and Analogizers 2710. As shown in FIG. 27 each of these techniques may be implemented thru a nonlinear modeling and forecasting technique 2712 that enables implement all of the techniques together such that the types of data that are processed using each of these techniques may be processed using the nonlinear modeling and forecasting technique.

The symbolists school 2702 of machine learning focuses on inverse deduction or induction. Induction involves proving an individual instance to be true, and then showing that it is true for all other instances as well. This is the inverse of deduction in that deduction is based on a general principle to make a specific conclusion. The symbolists based system 2702 essentially works backwards to fill in the gaps in the system's knowledge. The origins are based on logic and philosophy. The implementation of this method can be seen in modern scientist robots because the method is very similar to the way real scientists work. Humans handle these robots to allow the robots to perform tasks that are much like modern human scientists.

The Connectionist school 2704 of machine learning "reverse engineers the brain" by creating artificial neurons so this technique obviously has its origins in neuroscience. The artificial neurons work by taking in inputs given individual weights. If the weighted inputs reach the threshold for a given neuron then the neuron will "fire" or send a 1. If the inputs do not reach the threshold then it will send a 0. Back propagation helps solve problems when error is introduced. Back propagation is the concept of which neuron needs to change and by how much to more accurately reflect the model. If a value of 1 should be seen at the output but only a value of 0.2 appears, then the error is valued as 0.8. This error value is compared to the weights of each input of the neuron as well as previous neurons in the network. This is executed all the way back to the initial inputs of the system and it is where we get the term backpropagation. This process of creating neural networks is called deep learning, and it is applied to areas of vision and image processing. It can also be found in Google's Cat Network that helps identify many images such as the human face and even cats. This method excels at allowing a computer to learn about a given set of information criteria.

This Evolutionaries school 2706 mimics evolution by constantly evolving and adapting to unknown conditions. The Evolutionaries technique 2706 models genes and DNA in the evolutionary process. Not only do they simulate evolution, but they are applied to modern day applications such as robotics. The performance data of such robots is carried over to the next model as a kind of "robot selection." This approach is similar to selective breeding and results in very robust outcomes because there have been many trials of the model beforehand. John Holland was a very prominent name for Evolutionaries 2706 and continues to be even after his death in 2015. Holland was a pioneer in genetics algorithms in computer science and created a foundational "fundamental theorem in genetics algorithm." 3D printing and bioinformatics are also areas that are carried out by those in the Evolutionaries school 2706.

The Bayesian school 2708 handles uncertainty with probabilistic interference and has an origin in statistics. This method starts off with an initial hypothesis and then updates your belief in each hypothesis based on incoming evidence. Eventually the system will end up with a hypothesis that is more likely than the others. Self-driving cars and spam filtering are one of the main users of Bayesian inference 2708. The initial hypothesis is called a prior. Data is obtained, and the prior is updated based on the data. The outcome is called a posterior and the posterior is updated with more data to become a prior again. The method is repeated until an outcome is produced.

The Analogizers school 2710 of thought matches bits of data together through analogy. This may seem like a simple approach, but it is actually similar to the neural networks methods because of its nearest neighbor principle. An example of this nearest neighbor approach is the technology applied to Netflix movie ratings. Users with similar ratings will get similar recommendations based on these reviews.

Assisted AI Summary

Figure 28:
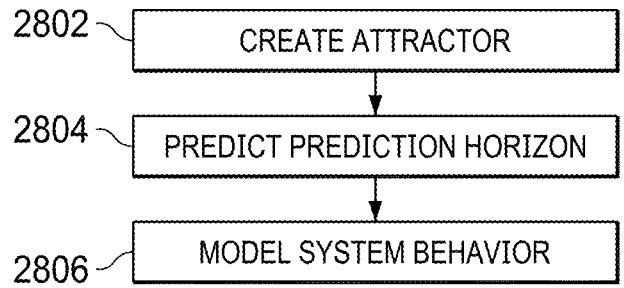
FIG. 28 illustrates a process for modeling system behavior from an attractor.

Each of the above described systems can solve a specific problem better than the other four systems, and it is best to combine all of systems for maximum effectiveness. Each school of thought has its own master algorithm. The challenge is to design a master algorithm that will solve all the problems that each school aims to resolve. Attractor assisted AI such as that disclosed above combines the benefits of all these approaches. This method illustrated in FIG. 28 uses the drivers of a dynamical system to create an attractor at step 2802 that can predict up to a value of T at step 2804 that is the prediction horizon to enhance machine learning methods by making them faster and using less training data. This enables modeling of the behavior of a system at step 2806 using an attractor in terms of some invariants directly extractable from the system's dynamics, without reference to any underlying dynamics. The value of T is the forecasting window for all systems and serves as the horizon to which a prediction can be accurately approximated. A larger data set will increase the forecasting capabilities up to a value of T which is the forecasting window. Any prediction beyond $T_{max}$ is no more accurate than a statistical model. This attractor method benefits form the use of a Graphics Processing Unit (GPU) because it requires many simultaneous calculations. The GPU is used to generate an attractor that can be used to predict non-linear systems more accurately than a statistical method that can then be implemented into an artificial intelligence for use with machine learning. The implementation of all five methods of machine learning into one method makes attractor assisted AI the master algorithm for machine learning as a unified theory of machine learning.

Nonlinear Data from Sucrose and Modeling of Bio-Markers

Figure 29:
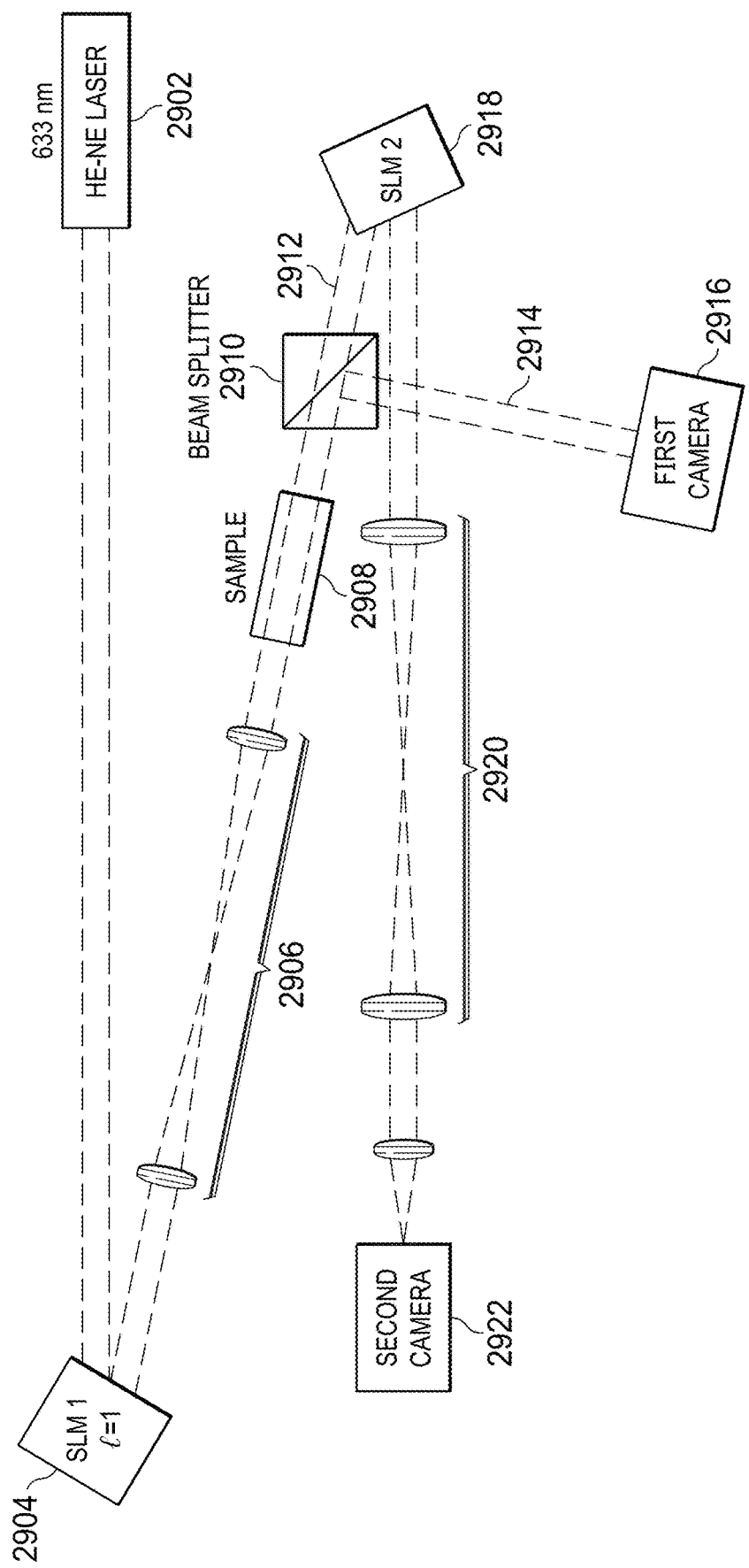
FIG. 29 illustrates a system for detecting glucose nonlinear dynamics.

In modeling the glucose for its detection, glucose has been discovered to exhibit nonlinear dynamics which are captured as described in FIG. 29. The dynamics is the amplitude of the intensity of twisted beams as they interact with a solution with different concentration of Glucose or Sucrose. By applying the nonlinear dynamic techniques described herein, we can reconstruct the strange attractor of the dynamics and the topological invariants are specific bio-markers of the Glucose or Sucrose.

One manner for detecting sucrose and glucose has been describe in U.S. patent application Ser. No. 15/653,585, entitled SYSTEM AND METHOD FOR MAKING CONCENTRATION MEASUREMENTS WITHIN A SAMPLE MATERIAL USING ORBITAL ANGULAR MOMENTUM, filed on Jul. 19, 2017, which is incorporated herein by reference. This application describes a process using detection of Orbital Angular Momentum (OAM) within signals that have passed through a sample. The detection of OAM enabled detection of materials and concentrations of materials. OAM endowed beams have an azimuthal phase shift. As described in the referenced application, OAM beams phase front may change if passed through a chiral matter. OAM beams can interact with chiral molecules to enable detection of glucose and sucrose.

The electric field of Laguerre-Gaussian processed beams may be defined as:

$$E(\rho, \phi, z) = E_0 \left(\frac{\sqrt{2}\rho}{w_0}\right)^l L_p^l\left(2\frac{\rho^2}{w_0^2}\right)\exp\left(-\frac{\rho^2}{w_0^2}\right)\exp(jl\phi)$$

Figure 30:
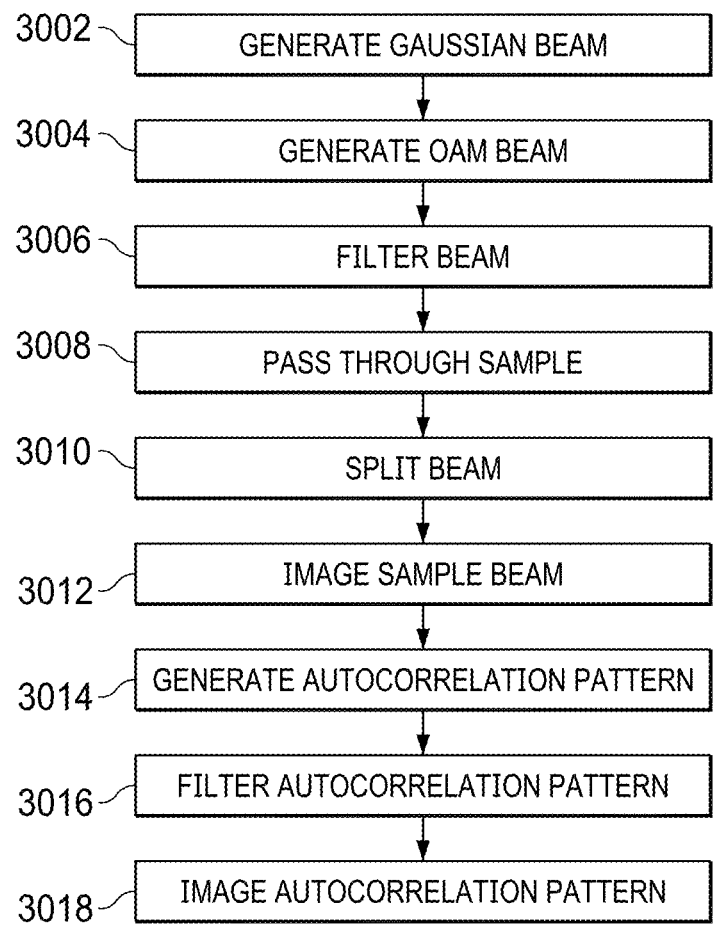
FIG. 30 illustrates a flow diagram of the process for detecting glucose nonlinear dynamics.

The electric field may be detected using for example the technique described in FIG. 30.

FIGS. 29 and 30 illustrate an experimental set up for detecting glucose nonlinear dynamics. As discussed, the dynamics relates to the amplitude of the intensity of the twisted beams as they interact with different concentrations of glucose and sucrose. A Gaussian beam is generated at step 3002 from a helium neon laser 2902. The Gaussian beam is applied to a spatial light modulator 2904 to generate a first order OAM beam at step 3004. The generated OAM beam is filtered at step 3006 using a 4F system 2906 and passes through a sample 2908 at step 3008. The beam exiting the sample 2908 is applied to a beam of splitter 2910 that splits the beam at step 3010 into a first beam 2912 and a second beam 2914. Beam 2914 is imaged at step 3012 by a camera 2916 to generate images of the OAM beam that has passed through the sample 2908. Beam 2912 is applied to a second spatial light modulator 2918 that generates at step 3014 an autocorrelation pattern that is filtered at step 3016 by a second 4F system 2920. A second camera 2922 takes images of the autocorrelation pattern at step 3018.

Figure 32:
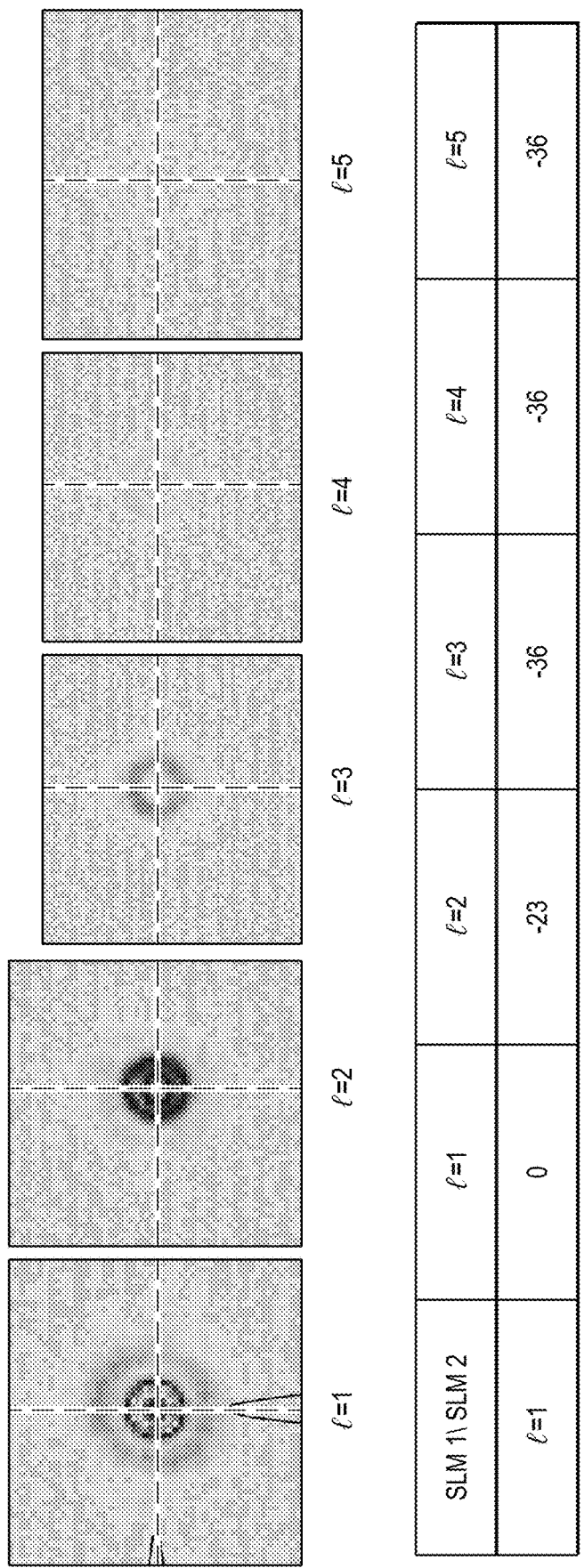
Figure 33:
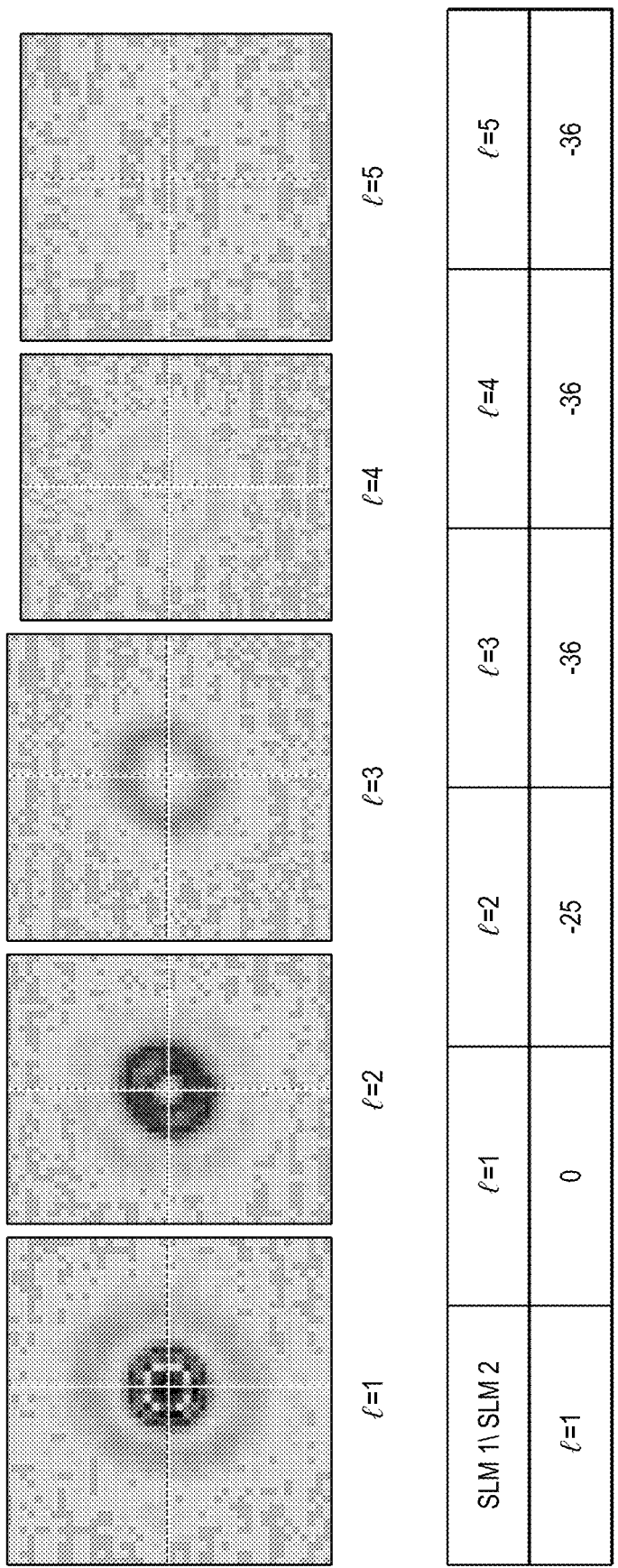
Figure 34:
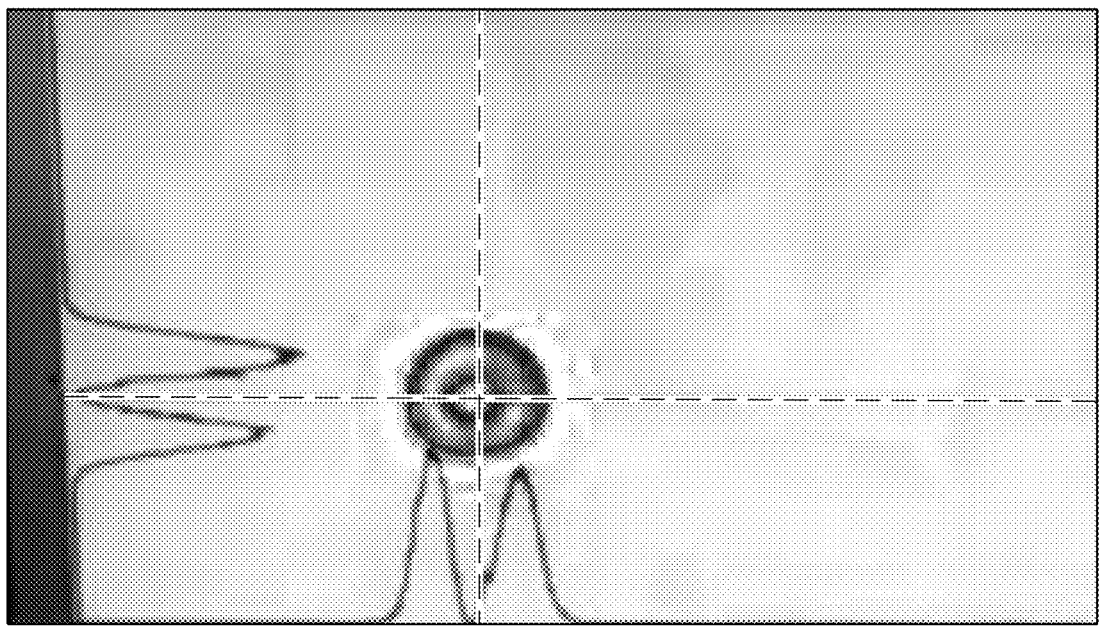

Using the techniques described in FIGS. 29 and 30, the image as illustrated in FIGS. 31-34 may be generated. FIG. 31 illustrates intensity images for an empty Cuvette 3102, a Cuvette plus water 3104 and a Cuvette+30% sucrose water 3106. The image for Cuvette+50% sucrose water 3108 was not stable. FIG. 32 illustrates a correlation pattern for a water sample for OAM values of l=1 through l=5. FIG. 33 illustrates a correlation pattern for a water+30% sucrose sample for OAM values of l=1 through l=5. FIG. 34 illustrates a water+50% sucrose sample. The image was unstable after 30 minutes and varied over time.

The variations in intensity over time and maybe analyzed to establish an attractor as described hereinabove in the established attractor used for the generations of predictions with respect to levels of sucrose and glucose with respect to the OAM levels as shown in FIG. 35. Initially, the time series associated with the dynamical changes in the intensity and the phase of the detected signal in the sample is determined at step 3502. The output matrix generation is accomplished by first using a Delay Embedding technique to construct the attractor of the dynamics of the intensity levels at step 3504. This requires an optimum delay to be used using minima of the mutual information. The last point in the data time series will be somewhere on the surface of the reconstructed attractor. That point can be represented as a vector in the multi-dimensional embedding space (connecting the origin to that point with a vector |P>(p for present) at step 3506. This vector has the same dimension (components) as the embedding dimension. Each embedding dimension represents a driver of the dynamics. For a selected present point on the attractor (the end point of vector |p>), a hypersphere is created at step 3508 around the point and then a determination is made at step 3510 of how other points in the hypersphere evolve in time. The matrix of evolution of these points corresponds to the matrix H. Linear regression is then applied by applying the matrix H to vector |p> at step 3512. The outcome comprises a vector for a future state vector |P>. k This approach corresponds to a nonlinear regression. Compared with least squares regression, the orthogonal technique can reduce the high dimensions, overcome the multicollinearity among H, which are caused by an improper number of hidden layer nodes Photonic Reservoir Computing Reservoir Computing (RC) is a set of machine learning methods for designing and training artificial neural networks. RC is a framework for computation that may be viewed as an extension of neural network. Typically an input signal is fed into a fixed (random) dynamical system called a reservoir and the dynamics of the reservoir map the input to a higher dimension, and a simple readout mechanism is trained to read the state of the reservoir and map it to the desired output. The main benefit is that training is performed only at the readout stage and the reservoir is fixed. The reservoir consists of a collection of recurrently connected units. The connectivity structure is usually random, and the units are usually nonlinear. The overall dynamics of the reservoir driven by the input, and is also affected by the past. A rich collection of dynamical input-output mapping is a crucial advantage over time delay neural networks. The idea behind these techniques is that one can exploit the dynamics of a recurrent nonlinear network to process time series without training the network itself, but simply adding a general linear readout layer and only training the latter. This results in a system that is significantly easier to train (the learning is reduced to solving a system of linear equations), yet powerful enough to match other algorithms on a series of benchmark tasks. Thus, the implementation leverages the dynamics of the nonlinearity to process time series without training the network itself. The attractor of any time series with a photonic reservoir is modeled in a similar manner to how turbulent dynamo and the attractor of flux signals are modeled. RC has been successfully applied to, for instance, channel equalization, speech recognition and won an international competition on prediction of future evolution of financial time series.

Reservoir Computing enables efficiently implementation of simplified recurrent neural networks in hardware, such as e.g. optical components. Optical computing has been investigated for decades as photons propagate faster than electrons, without generating heat or magnetic interference, and thus promise higher bandwidth than conventional computers. The photonic approach is notably different from the state-of-the-art electronic brain simulators, such as the Neurogrid from Stanford University and the SyNAPSE from IBM. It is also less complex than recent hardware implementations of spiking networks, since the reservoir is composed of simple analog neurons. Thus, RC would enable building of high-speed and energy efficient photonic devices.

The potential of these RC systems can be significantly increased by feeding the output signal back into the reservoir. It has been shown that this additional feedback allows the algorithm to solve long horizon prediction tasks, such as forecasting chaotic time series, which are impossible to solve otherwise. The use of feedback would also allow the setup to run autonomously. This would provide the system with the ability to produce an output signal without receiving any input signal, and thus make the system capable of generating a periodic time series. Implementing this idea experimentally requires, in principle, a sufficiently fast readout layer capable of generating and feeding back the output signal in real-time (analog).

Figure 36:
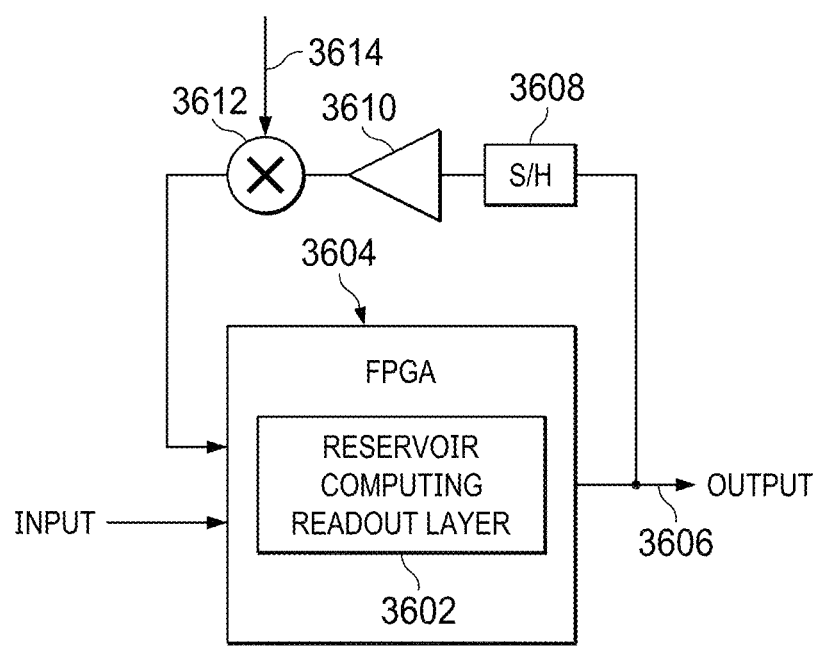
FIG. 36 illustrates a photonic reservoir system with output feedback.

Referring now to FIG. 36, there is illustrated a photonic reservoir system with an output feedback. The readout layer of the opto-electronic reservoir 3602, can be implemented on an FPGA 3604. The use of high-speed dedicated electronics makes it possible to compute the output signal 3606 in real time, and thus feed it back into the reservoir 3602. This results in a digital readout layer, that nevertheless allows one to investigate many of the issues that will affect a system with purely analogue feedback. Using analog output layers for output feedback would require adding an additional electronic circuit consisting of a sample and hold circuit 3608, amplification 3610, and multiplication 3612 by the input mask 3614. Such a two-step procedure, in which part of the experiment is analog and part digital, is a natural procedure.

Extreme Learning Machine

Extreme learning machines are feedforward neural networks for classification, regression, clustering, sparse approximation, and feature learning with a single layer or multiple layers of hidden nodes, where the parameters of hidden nodes (not just the weights connecting inputs to hidden nodes) need not be tuned. These hidden nodes can be randomly assigned and never updated (i.e. they are random projection but with nonlinear transforms), or can be inherited from their ancestors without being changed. In most cases, the output weights of hidden nodes are usually learned in a single step, which essentially amounts to learning a linear model.

In most cases, ELM is used as a single hidden layer feedforward network (SLFN) including but not limited to sigmoid networks, RBF networks, threshold networks, fuzzy inference networks, complex neural networks, wavelet networks, Fourier transform, Laplacian transform, etc. Due to its different learning algorithm implementations for regression, classification, spare coding, compression, feature learning and clustering, multi ELMs have been used to form multi hidden layer networks, deep learning or hierarchical networks. A hidden node in ELM is a computational element, which need not be considered as classical neuron. A hidden node in ELM can be classical artificial neurons, basis functions, or a subnetwork formed by some hidden nodes.

A Feedforward neural network, such as a back-propagation (BP) neural network, is a good method for time series prediction. But for traditional feedforward neural networks, there are some limitations which have a negative effect on the application of these neural networks (local minimum, high computation complexity, slow convergence speed . . . etc.). To overcome these problems, extreme learning machine (ELM) can be used based on a Penrose generalized inverse matrix. For ELM, there are random allocations for input weights and thresholds, and the output weights can be worked out just by one step. Therefore, the ELM only needs to determine the number of hidden layer nodes. But an appropriate number of hidden layer nodes are difficult to be determined. When the number of hidden layer nodes is small, ELM may not be able to effectively study the samples. But when the number of hidden layer nodes is large, it will enlarge the computation complexity and even result in overfitting for ELM. Therefore, to improve the prediction performance and generalization performance, it is important to eliminate the influence of hidden layer nodes to prediction or choose an appropriate number of hidden layer nodes.

There is a fast-pruned extreme learning machine (P-ELM) that was applied to classification successfully. There is also an optimally pruned extreme learning machine (OP-ELM). These methods all try to get the optimal number of hidden layer nodes using a pruning method. However, for a pruning method, it is difficult to determine the initial size of the neural networks. And it is always common to start with a larger size initial neural network in order to provide better prediction accuracy. So, the computational complexity is always high and the training time is also large. There are also methods with an incremental extreme learning machine (I-ELM) based on enhanced random search. For example, there are proposals with an error minimized extreme learning machine (EM-ELM) based on the growth of hidden nodes and incremental learning. These methods both try to get the optimal number of hidden layer nodes by a growing method. But for a growing method, with the increase of hidden layer nodes, the output weights should be recalculated. So, a growing method also greatly enlarges the computation complexity of ELM.

These methods all try to eliminate the influence of hidden layer nodes to prediction by getting the optimal number of hidden layer nodes, but the computation complexity is always high. There are still proposals that try to solve the problem by other ways such as a kernel method. In this method, kernel function is used to build the nonlinear mapping, and the number of hidden layer nodes does not need to be selected. So, the kernel method can overcome the influence of the hidden layer nodes for prediction. But for different kernel functions, they have different characteristics, and the performances are different with different datasets.

Therefore, to overcome the influence of a large number of hidden layer nodes for prediction and to enhance the prediction performance of ELM, an improved ELM is proposed based on orthogonal projections to a latent structures method. The improved ELM can have the steps as more fully illustrated in FIG. 37. Firstly, the hidden layer of ELM is used to build the nonlinear mapping for input variables at step 3702 and generate the output matrix H, where the number of bidden layer nodes can be randomly assigned. The output matrix generation is accomplished by first using a Delay Embedding technique to construct the attractor of the dynamics at step 3704. This requires an optimum delay to be used using minima of the mutual information. The last point in the data time series will be somewhere on the surface of the reconstructed attractor. That point can be represented as a vector in the multi-dimensional embedding space (connecting the origin to that point with a vector |P>(p for present) at step 3706. This vector has the same dimension (components) as the embedding dimension. Each embedding dimension represents a driver of the dynamics. For a selected present point on the attractor (the end point of vector |p>), a hypersphere is created at step 3708 around the point and then a determination is made at step 3710 of how other points in the hypersphere evolve in time. The matrix of evolution of these points corresponds to the matrix H. Linear regression is then applied by applying the matrix H to vector |p> at step 3712. The outcome comprises a vector for a future state vector |P>. k This approach corresponds to a nonlinear regression. Compared with least squares regression, the orthogonal technique can reduce the high dimensions, overcome the multicollinearity among H, which are caused by an improper number of hidden layer nodes.

Qubit and Qudit Neural Network Approach

In quantum computing a qubit or quantum bit is the basic unit of quantum information and comprises the quantum version of the classical binary bit physically realized with a two-state device. A qubit is a two-state quantum-mechanical system, one of the simplest quantum systems displaying the characteristics of quantum mechanics. Examples include: the spin of the electron in which the two levels can be taken as spin up and spin down; or the polarization of a single photon in which the two states can be taken to be the vertical polarization and the horizontal polarization. In a classical system, a bit would have to be in one state or the other. However, quantum mechanics allows the qubit to be in a coherent superposition of both states/levels at the same time, a property that is fundamental to quantum mechanics and thus quantum computing.

In quantum computing, the concept of 'qubit' has been introduced as the counterpart of the classical concept of 'bit' in conventional computers. The two qubit states labeled as |0> and |1> correspond to the classical bits 0 and 1 respectively. The arbitrary qubit state |φ> maintains a coherent superposition of states |0> and |1>:

$$|\varphi\rangle = a|0\rangle + b|1\rangle$$

where a and b are complex numbers called probability amplitudes. That is, the qubit state |φ) collapses into either |0> state with probability $|a|^2$, or |1> state with probability $|b|^2$ with satisfying $|a|^2+|b|^2=1$.

The qubit state |φ> is described as $$|\varphi\rangle = \cos\theta|0\rangle + e^{i\psi}\sin\theta|1\rangle$$

which is called Bloch-sphere representation. In order to give a minimum representation of the basic quantum logic gates, this is rewritten at step 3802 as a function with complex-valued representation, by corresponding the probability amplitudes a and b as the real part and imaginary part of the function respectively. The quantum state with complex-valued representation is described as $$f(\theta) = e^{i\theta} = \cos\theta + i\sin\theta,$$

Quantum Gate and Representation

In quantum computing and specifically the quantum circuit model of computation, a quantum logic gate (or simply quantum gate) is a basic quantum circuit operating on a small number of qubits. They are the building blocks of quantum circuits, like classical logic gates are for conventional digital circuits.

Unlike many classical logic gates, quantum logic gates are reversible. However, it is possible to perform classical computing using only reversible gates. For example, the reversible Toffoli gate can implement all Boolean functions, often at the cost of having to use ancillary bits. The Toffoli gate has a direct quantum equivalent, showing that quantum circuits can perform all operations performed by classical circuits.

Quantum logic gates are represented by unitary matrices. The most common quantum gates operate on spaces of one or two qubits, just like the common classical logic gates operate on one or two bits. As matrices, quantum gates can be described by $2^n \times 2^n$ sized unitary matrices, where n is the number of qubits that the gates act on. The variables that the gates act upon, the quantum states, are vectors in $2^n$ complex dimensions, where n again is the number of qubits of the variable. The base vectors are the possible outcomes if measured, and a quantum state is a linear combination of these outcomes.

Figure 39:
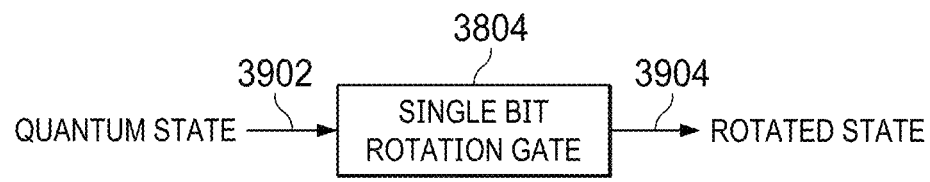
FIG. 39 illustrates a single bit rotation gate.

Referring now to FIG. 38, in quantum logic circuits, fundamental quantum gates 3802 are the single bit rotation gate 3804 and two-bit controlled NOT gate 3806. Any quantum logic circuit can be constructed by combinations of these two gates. As shown in FIG. 39, a single bit rotation gate 3804 takes a quantum state as its input 3902 and outputs a rotated state in the complex plane at its output 3904. This gate can be described as $$f(\theta_1+\theta_2) = f(\theta_1) \cdot f(\theta_2).$$

Figure 40:
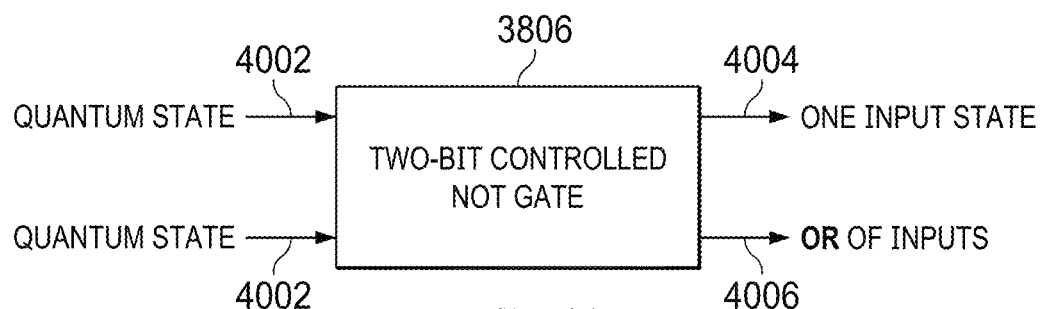
FIG. 40 illustrates a two bit controlled NOT gate.

A two-bit controlled NOT gate 4002, as shown in FIG. 40, takes two quantum states as its inputs 4002 and gives two outputs: one of the input states 4004 and the exclusive OR-ed result of two inputs 4006. It is necessary to represent the inversion and non-inversion of the quantum state in order to describe this operation, thus a controlled input parameter V is introduced:

$$f\left(\frac{\pi}{2}\gamma + (1-2\gamma)\cdot\theta\right) = \begin{cases} \cos\theta + i\sin\theta, & \gamma = 0 \\ \sin\theta + i\cos\theta, & \gamma = 1 \end{cases}$$

The output state of the neuron k, denoted as $x_k$, is given as $$x_k = f(y_k) = \cos y_k + i \sin y_k = e^{iy_k}$$

A similar formulation for Qudits and a corresponding neural network approach may also be provided.

In recent years, scientists have developed quantum-neuro computing in which the algorithm of quantum computation is used to improve the efficiency of neural computing systems. The quantum state and the operator of quantum computation are both important to realize parallelisms and plasticity respectively in information processing systems. The complex valued representation of these quantum concepts allows neural computation system to advance in learning abilities and to enlarge its possibility of practical applications. The application of the above described application of nonlinear modeling and forecasting to AI may be implemented according to two specific proposals. One is to use a Qubit neural network model based on 2-dimensional Qubits and the second is to expand the Qubits to multi-dimensional Qudits and further investigate their characteristic features, such as the effects of quantum superposition and probabilistic interpretation in the way of applying quantum computing to a neural network.

Figure 41:
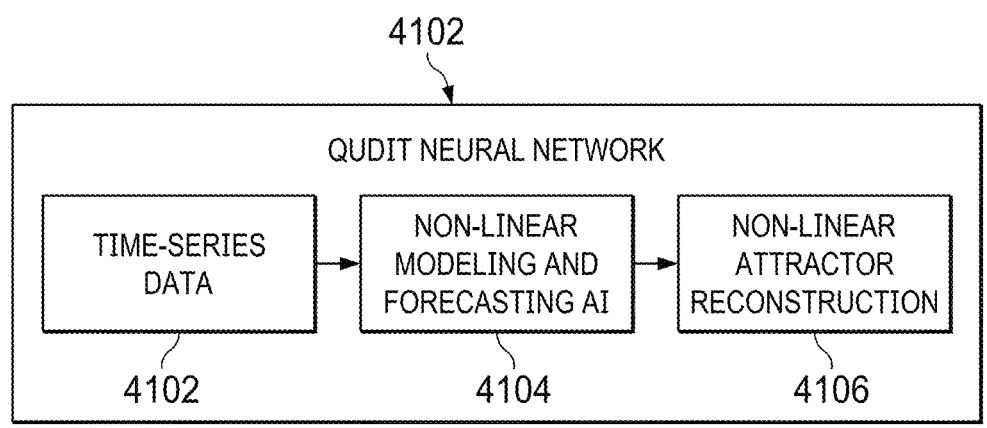
FIG. 41 illustrates a Qudit neural network.

One of the applications for neural networks is to predict time-series from dynamical systems in the manner discussed above, especially from chaotic systems by their various applications. There have been several attempts to use real-valued neural networks for predictions, but there have been no attempts for prediction by complex-valued Qudit-based neural networks using nonlinear attractor reconstruction as introduced above where learning iterations, learning success rates, and prediction errors may be examined. Thus, as shown generally in FIG. 41, a Qudit based neural network 4102 may implement nonlinear modeling and forecasting to AI 4104 that generates a nonlinear attractor reconstructions 4106 from the time-series data 4108.

This process implements developments in quantum-neuro computing in which the algorithm of quantum computation is used to improve the efficiency of a neural computing system and those can be used in conjunction with the use of attractors to predict future behavior. The described attractor approach is totally classical and not quantum mechanical. For example when delaying embedding to reconstruct the attractor, it is one simple process of delay embedding that occurs multiple times in parallel and therefore quantum computation can be used to realize parallelisms in real time to perform the process of delay embedding. Two specific proposals are set forth. The first is to use Qubit neural network model based on 2-dimensional Qubits to construct attractors and provide predictions of future behavior as described herein and the second is to expand the Qubits to multi-dimensional Qudits for the same purposes and further investigate their characteristic features, such as the effects of quantum superposition and probabilistic interpretation in the way of applying quantum computing to neural network.

CONCLUSIONS

Nonlinear dynamics are an effective tool for the analysis of time series data. The chief difficulty in applying these techniques to real data has been the lack of good criteria for the selection of the time delay required for optimal embedding of the data in phase-space. A specific technique is presented herein for this selection based on the mutual information for the time series. The selection works well for model systems and is now being used to reconstruct the dynamics for other data sets. The technique of attractor reconstruction (Ruelle, Takens, and Packard) has been applied to the $F_{10.7}$ time series. The resulting attractor has been used to make forecasts of future data.

The forecasts must be tuned to take into account the dimension of the system defined by the reconstructed attractor and the Lyapunov exponent for the system. In addition, techniques that forecast the phasing of the extremas of the variations should be examined.

In addition to the efforts described herein, several tasks can further enhance forecasting techniques. These tasks include the following: noise reduction using the nonlinear techniques developed by Kostelich and Yorke, (E. J. Kostelich and J. A. Yorke, "Noise Reduction: Finding the Simplest Dynamical System Consistent with the Data," *Physica* D 41, 183, (1990), which is incorporated herein by reference), and the more recent technique developed by Sauer (T. Sauer, "A Noise Reduction Method for Signals from Nonlinear Systems," *Physica* D 58, 193, 1992, which is incorporated herein by reference) accurate calculation of the dynamical invariants of the attractor like the Badii-Politi dimension (R. Badii and A. Politi, *J. Stat. Phys.* 40, 725 (1985), which in incorporated herein by reference) of the system (needed to determine the forecast horizon); and the development of the optimal linear association method pioneered by Jimenez and Moreno as described in J. Jimenez and J. Moreno, *Phys. Rev. A.,* 45, 3553, March 1992 which is incorporated herein by reference.

Finally, connections between the nonlinear models and the physics of the time series can be used to for example fit ordinary differential equations to chaotic data. Baake has introduced a technique by which one can treat the problem of fitting ordinary differential equations to chaotic data using boundary value methods as described in E. Baake et al., "Fitting Ordinary Differential Equations to Chaotic Data," *Phys. Rev. A,* 45, 1985 which is incorporated herein by reference. Ashrafi and Roszman have constructed a canonical transformation that can transform the dynamo equations to the established Lorenz form as shown in S. Ashrafi and L. Roszman, Solar Flux Forecasting Using Mutual Information with Optimal Delay, AAS 93-311, Spaceflight Dynamics 1993, American Astronautical Society Publication, Advances in the Astronautical Sciences, Volume 84 Part II pages 901-913. The Lorenz equations have been studied in great detail in the chaos literature.

It will be appreciated by those skilled in the art having the benefit of this disclosure that this a unified nonlinear modeling approach for machine learning and artificial intelligence provides an improved method for prediction future occurrences of time series data. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for predicting future behavior for a dynamic system using an artificial intelligence system, comprising:
   implementing the artificial intelligence system within a field programmable gate array;
   configuring a chaotic oscillator within the field programmable gate array implementing the artificial intelligence system;
   receiving a predetermined amount of a time series group of data from the dynamic system defining previous behavior of the dynamic system at the artificial intelligence system implemented within the field programmable gate array;
   constructing an attractor from the time series group of data defining the previous behavior of the dynamic system using the artificial intelligence system implemented within the field programmable gate array, the attractor modeling the previous behavior of the dynamic system based on the predetermined amount of the time series group of data of the dynamic system;
   determining a prediction horizon for the predetermined amount of the time series group of data with the artificial intelligence system implemented within the field programmable gate array using an attractor dimension of the constructed attractor and a Lyapunov exponent of the constructed attractor, wherein the prediction horizon increases logarithmically as a length of the predetermined amount of the time series group of data from the dynamic system increases linearly;
   generating prediction values of future behavior of the dynamic system with the artificial intelligence system implemented within the field programmable gate array using the constructed attractor and the determined prediction horizon; and
   wherein the steps of constructing the attractor, determining the prediction horizon and generating the prediction values are performed in applications by the artificial intelligence system implemented within the field programmable gate array.

2. The method of claim 1, wherein the step of constructing further comprises:
   creating a time delay value for the predetermined amount of the time series group of data using the artificial intelligence system implemented using the within the field programmable gate array; and
   constructing the attractor responsive to the predetermined amount of the time series group of data and the time delay value using the artificial intelligence system implemented using the within the field programmable gate array.

3. The method of claim 2, wherein the step of creating the time delay value further comprises:
   determining mutual information having a first local minimum for the time series group of data; and
   determining the time delay value using the first local minimum of the mutual information.

4. The method of claim 1, wherein the step of constructing further comprises:
   determining drivers of the dynamic system using the artificial intelligence system implemented using the within the field programmable gate array; and
   constructing the attractor responsive to determined drivers using the artificial intelligence system implemented using the within the field programmable gate array.

5. The method of claim 1, wherein the step of constructing further comprises:
   extracting invariants from the dynamic system using the artificial intelligence system implemented using the within the field programmable gate array without reference to underlying physics of the dynamic system; and
   constructing the attractor responsive to the invariants using the artificial intelligence system implemented using the within the field programmable gate array.

6. The method of claim 1, wherein a graphics processing unit implements the artificial intelligence system implemented using the within the field programmable gate array using the constructed attractor.

7. The method of claim 1, wherein the step of determining the prediction horizon further comprise:
   determining an attractor dimension of the attractor using the artificial intelligence system implemented using the within the field programmable gate array;
   determining a Lyapunov exponent of the attractor using the artificial intelligence system implemented using the within the field programmable gate array; and
   calculating the prediction horizon responsive to the attractor dimensions and the Lyapunov exponent, wherein the prediction horizon increases logarithmically as the length as the predetermined amount of the time series group of data from the dynamic system increases linearly using the artificial intelligence system implemented using the within the field programmable gate array.

8. The method of claim 1, wherein the step of generating the prediction values of future behavior further comprise:
   selecting a plurality of neighbors within the time series group of data;
   examining data sets of the attractor for the plurality of neighbors; and
   generating the prediction values of the future behavior responsive to values of the data sets of the attractor for the plurality of neighbors.

9. The method of claim 1, wherein the step of generating prediction values further comprises generating the prediction values of the future behavior of at least one of a same historical input of the dynamic system as the received time series group of data or a different driver of the dynamic system from the received time series group of data with the field programmable gate array implementing the artificial intelligence system using the constructed attractor and the determined prediction values.

10. A system for predicting future behavior for a dynamic system, comprising:
    a field programmable gate array implementing an artificial intelligence system providing nonlinear modeling and forecasting processing for analyzing the dynamic system, the field programmable gate array further implementing a chaotic oscillator;
    wherein the field programmable gate array implementing the artificial intelligence system receives a predetermined amount of a time series group of data from the dynamic system defining previous behavior of the dynamic system;
    wherein the field programmable gate array implementing the artificial intelligence system constructs an attractor from the time series group of data defining the previous behavior of the dynamic system, the attractor modeling the previous behavior of the dynamic system based on the predetermined amount of the time series group of data of the dynamic system;

wherein the field programmable gate array implementing the artificial intelligence system determines a prediction horizon for the predetermined amount of the time series group of data using an attractor dimension of the constructed attractor and a Lyapunov exponent of the constructed attractor, wherein the prediction horizon increases logarithmically as a length of the predetermined amount of the time series group of data from the dynamic system increases linearly;

wherein the field programmable gate array implementing the artificial intelligence system generates prediction values of future behavior of the dynamic system using the constructed attractor and the determined prediction horizon; and wherein the field programmable gate array implementing the artificial intelligence system constructs the attractor, determines the prediction horizon and generates the prediction values in applications.

11. The system of claim 10 further comprising:

wherein the nonlinear modeling and forecasting processing further configures the field programmable gate array implementing the artificial intelligence system to create a time delay value for the time series group of data; and wherein the nonlinear modeling and forecasting processing further configures the field programmable gate array implementing the artificial intelligence system to construct the attractor responsive to the time series group of data and the time delay value.

12. The system of claim 11 further comprising:

wherein the nonlinear modeling and forecasting processing further configures the field programmable gate array implementing the artificial intelligence system to determine mutual information having a first local minimum for the time series group of data; and wherein the nonlinear modeling and forecasting processing further configures the field programmable gate array implementing the artificial intelligence system to determine the time delay value using the first local minimum of the mutual information.

13. The system of claim 10 further comprising:

wherein the nonlinear modeling and forecasting processing further configures the field programmable gate array implementing the artificial intelligence system to determine drivers of the dynamic system; and wherein the nonlinear modeling and forecasting processing further configures the field programmable gate array implementing the artificial intelligence system to construct the attractor responsive to determined drivers.

14. The system of claim 10 further comprising:

wherein the nonlinear modeling and forecasting processing further configures the field programmable gate array implementing the artificial intelligence system to extract invariants from the dynamic system without reference to underlying physics of the dynamic system; and wherein the nonlinear modeling and forecasting processing further configures the field programmable gate array implementing the artificial intelligence system to construct the attractor responsive to the invariants.

15. The system of claim 10 further comprising:

wherein the nonlinear modeling and forecasting processing further configures the field programmable gate array implementing the artificial intelligence system to determine an attractor dimension of the attractor;

wherein the nonlinear modeling and forecasting processing further configures the field programmable gate array implementing the artificial intelligence system to determine the Lyapunov exponent of the attractor, wherein the prediction horizon increases logarithmically as the length of the predetermined amount of the time series group of data from the dynamic system increases linearly; and wherein the nonlinear modeling and forecasting processing further configures the field programmable gate array implementing the artificial intelligence system to calculate the prediction horizon responsive to the attractor dimensions and the Lyapunov exponent.

16. The system of claim 10 further comprising:

wherein the nonlinear modeling and forecasting processing further configures the field programmable gate array implementing the artificial intelligence system to select a plurality of neighbors within the time series group of data;

wherein the nonlinear modeling and forecasting processing further configures the field programmable gate array implementing the artificial intelligence system to examine data sets of the attractor for the plurality of neighbors; and wherein the nonlinear modeling and forecasting processing further configures the field programmable gate array implementing the artificial intelligence system to generate the prediction values of the future behavior responsive to values of the data sets of the attractor for the plurality of neighbors.

17. The system of claim 10, wherein the field programmable gate array implementing the artificial intelligence system is further configured to generate the prediction values of the future behavior of at least one of a same historical input of the dynamic system as the received time series group of data or a different driver of the dynamic system from the received time series group of data with the field programmable gate array implementing the artificial intelligence system using the constructed attractor and the determined prediction values.

18. A method for predicting future behavior for a dynamic system using an artificial intelligence system, comprising:

implementing the artificial intelligence system within a field programmable gate array;

configuring a reservoir computing readout layer within the field programmable gate array implementing the artificial intelligence system;

establishing a feedback loop from an output of the field programmable gate array back to the reservoir computing readout layer;

receiving a predetermined amount of a time series group of data from the dynamic system defining previous behavior of the dynamic system at the artificial intelligence system implemented within the field programmable gate array;

constructing an attractor from the time series group of data defining the previous behavior of the dynamic system using the artificial intelligence system implemented within the field programmable gate array, the attractor modeling the previous behavior of the dynamic system based on the predetermined amount of the time series group of data of the dynamic system;

determining a prediction horizon for the predetermined amount of the time series group of data with the artificial intelligence system implemented within the field programmable gate array using an attractor dimension of the constructed attractor, Lyapunov exponent of the constructed attractor and a feedback input from the feedback loop from the output of the field programmable gate array, wherein the prediction horizon increases logarithmically as a length of the predetermined amount of the time series group of data from the dynamic system increases linearly;

generating prediction values of future behavior of the dynamic system with the artificial intelligence system implemented within the field programmable gate array using the constructed attractor, the determined prediction horizon and the feedback input from the feedback loop from the output of the field programmable gate array; and wherein the steps of constructing the attractor, determining the prediction horizon and generating the prediction values are performed in applications by the artificial intelligence system implemented within the field programmable gate array.

19. The method of claim 18, wherein the step of constructing further comprises:
creating a time delay value for the time series group of data using the artificial intelligence system implemented using the field programmable gate array including the reservoir computing readout layer; and
constructing the attractor responsive to the time series group of data and the time delay value.

20. The method of claim 19, wherein the step of creating the time delay value further comprises:
determining mutual information having a first local minimum for the time series group of data; and
determining the time delay value using the first local minimum of the mutual information.

21. The method of claim 18, wherein the step of constructing further comprises:
determining drivers of the dynamic system using the artificial intelligence system implemented using the field programmable gate array including the reservoir computing readout layer; and
constructing the attractor responsive to determined drivers using the artificial intelligence system implemented using the field programmable gate array including the reservoir computing readout layer.

22. The method of claim 18, wherein the step of constructing further comprises:
extracting invariants from the dynamic system using the artificial intelligence system implemented using the field programmable gate array including the reservoir computing readout layer without reference to underlying physics of the dynamic system; and
constructing the attractor responsive to the invariants using the artificial intelligence system implemented using the field programmable gate array including the reservoir computing readout layer.

23. The method of claim 18, wherein the artificial intelligence system implemented using the field programmable gate array including the reservoir computing readout layer is implemented on a graphics processing unit.

24. The method of claim 18, wherein the step of determining the prediction horizon further comprise:
determining an attractor dimension of the attractor using the artificial intelligence system implemented using the field programmable gate array including the reservoir computing readout layer;
determining the Lyapunov exponent of the attractor using the artificial intelligence system implemented using the field programmable gate array including the reservoir computing readout layer; and calculating the prediction horizon responsive to the attractor dimensions and the Lyapunov exponent, wherein the prediction horizon increases logarithmically as the length as the predetermined amount of the time series group of data from the dynamic system using the artificial intelligence system implemented using the field programmable gate array including the reservoir computing readout layer.

25. The method of claim 18, wherein the step of generating the prediction values of future behavior further comprise:
selecting a plurality of neighbors within the time series group of data;
examining data sets of the attractor for the plurality of neighbors; and
generating the prediction values of the future behavior responsive to the values of the data sets of the attractor for the plurality of neighbors.

26. The method of claim 18, wherein the step of generating prediction values further comprises generating the prediction values of the future behavior of at least one of a same historical input of the dynamic system as the received time series group of data or a different driver of the dynamic system from the received time series group of data with the field programmable gate array implementing the artificial intelligence system using the constructed attractor and the determined prediction values.

27. The method of claim 18, wherein the step of establishing the feedback loop further comprises:
sampling and holding the output of the field programmable gate array using a sample and hold circuit;
amplifying an output of the sample and hold circuit using an amplifier;
multiplying an output of the amplifier with an input mask using a multiplier circuit; and
providing the output of the multiplier circuit as an input to the reservoir computing readout layer.

28. A method for predicting future behavior for a dynamic system using an artificial intelligence system, comprising:
implementing the artificial intelligence system using a photonic reservoir configured with nonlinear optical components;
receiving a predetermined amount of a time series group of data from the dynamic system defining previous behavior of the dynamic system at the artificial intelligence system implemented within the photonic reservoir configured with the nonlinear optical components;
constructing an attractor from the time series group of data defining the previous behavior of the dynamic system using the artificial intelligence system implemented within the photonic reservoir configured with the nonlinear optical components, the attractor modeling the previous behavior of the dynamic system based on the predetermined amount of the time series group of data of the dynamic system;
determining a prediction horizon for the predetermined amount of the time series group of data with the artificial intelligence system implemented within the photonic reservoir configured with the nonlinear optical components using an attractor dimension of the constructed attractor, Lyapunov exponent of the constructed attractor, wherein the prediction horizon increases logarithmically as a length of the predetermined amount of the time series group of data from the dynamic system increases linearly;

generating prediction values of future behavior of the dynamic system with the artificial intelligence system implemented within the photonic reservoir configured with the nonlinear optical components using the constructed attractor and the determined prediction horizon; and wherein the steps of constructing the attractor, determining the prediction horizon and generating the prediction values are performed in applications by the artificial intelligence system implemented within the photonic reservoir.

29. A method for predicting future behavior for a dynamic system using an artificial intelligence system, comprising:

implementing the artificial intelligence system within a quantum circuitry based network using qubits;

receiving a predetermined amount of a time series group of data from the dynamic system defining previous behavior of the dynamic system at the artificial intelligence system implemented within the quantum circuitry based network using qubits;

constructing an attractor from the time series group of data defining the previous behavior of the dynamic system using the artificial intelligence system implemented within the quantum circuitry based network using qubits, the attractor modeling the previous behavior of the dynamic system based on the predetermined amount of the time series group of data of the dynamic system;

determining a prediction horizon for the predetermined amount of the time series group of data with the artificial intelligence system implemented within the quantum circuitry based network using qubits using an attractor dimension of the constructed attractor and a Lyapunov exponent of the constructed attractor, wherein the prediction horizon increases logarithmically as a length of the predetermined amount of the time series group of data from the dynamic system increases linearly;

generating prediction values of future behavior of the dynamic system with the artificial intelligence system implemented within the quantum circuitry based network using qubits using the constructed attractor and the determined prediction horizon; and wherein the steps of constructing the attractor, determining the prediction horizon and generating the prediction values are performed in applications by the artificial intelligence system implemented within quantum circuitry based network using qubits.

30. The method of claim 29, wherein the step of implementing further comprises the step of implementing the artificial intelligence system within the quantum circuitry based network using qubits based on 2-dimensional qubits.

31. A system for predicting future behavior for a dynamic system, comprising:

a field programmable gate array implementing an artificial intelligence system including a reservoir computing readout layer therein and providing nonlinear modeling and forecasting processing for analyzing the dynamic system;

a feedback loop from an output of the field programmable gate array back to the reservoir computing readout layer;

wherein the field programmable gate array implementing the artificial intelligence system including the reservoir computing readout layer therein receives a predetermined amount of a time series group of data from the dynamic system defining previous behavior of the dynamic system;

wherein the field programmable gate array implementing the artificial intelligence system including the reservoir computing readout layer therein constructs an attractor from the time series group of data defining the previous behavior of the dynamic system, the attractor modeling the previous behavior of the dynamic system based on the predetermined amount of the time series group of data of the dynamic system;

wherein the field programmable gate array implementing the artificial intelligence system including the reservoir computing readout layer therein determines a prediction horizon for the predetermined amount of the time series group of data using an attractor dimension of the constructed attractor and a Lyapunov exponent of the constructed attractor, wherein the prediction horizon increases logarithmically as a length of the predetermined amount of the time series group of data from the dynamic system increases linearly;

wherein the field programmable gate array implementing the artificial intelligence system including the reservoir computing readout layer therein generates prediction values of future behavior of the dynamic system using the constructed attractor and the determined prediction horizon; and wherein the field programmable gate array implementing the artificial intelligence system constructs the attractor, determines the prediction horizon and generates the prediction values in applications.

32. The system of claim 31, wherein the the feedback loop further comprises:

a sample and hold circuit for sampling and holding the output of the field programmable gate array;

an amplifier for amplifying an output of the sample and hold circuit;

a multiplier circuit for multiplying an output of the amplifier with an input mask; and an output for providing the output of the multiplier circuit as an input to the reservoir computing readout layer.

33. A system for predicting future behavior for a dynamic system, comprising:

nonlinear optical components implementing an artificial intelligence system including a photonic reservoir therein and providing nonlinear modeling and forecasting processing for analyzing the dynamic system;

wherein the nonlinear optical components implementing the artificial intelligence system including the photonic reservoir therein receive a predetermined amount of a time series group of data from the dynamic system defining previous behavior of the dynamic system;

wherein the nonlinear optical components implementing the artificial intelligence system including the photonic reservoir therein constructs an attractor from the time series group of data defining the previous behavior of the dynamic system, the attractor modeling the previous behavior of the dynamic system based on the predetermined amount of the time series group of data of the dynamic system;

wherein the nonlinear optical components implementing the artificial intelligence system including the photonic reservoir therein determines a prediction horizon for the predetermined amount of the time series group of data using an attractor dimension of the constructed attractor and a Lyapunov exponent of the constructed attractor, wherein the prediction horizon increases logarithmically as a length of the predetermined amount of the time series group of data from the dynamic system increases linearly;

wherein the nonlinear optical components implementing the artificial intelligence system including the photonic reservoir therein generates prediction values of future behavior of the dynamic system using the constructed attractor and the determined prediction horizon; and wherein the nonlinear optical components implementing the artificial intelligence system constructs the attractor, determines the prediction horizon and generates the prediction values in applications.

34. A system for predicting future behavior for a dynamic system, comprising:

a quantum circuitry based network using qubits implementing an artificial intelligence system providing nonlinear modeling and forecasting processing for analyzing the dynamic system;

wherein the quantum circuitry based network using qubits implementing the artificial intelligence system receives a predetermined amount of a time series group of data from the dynamic system defining previous behavior of the dynamic system;

wherein the quantum circuitry based network using qubits implementing the artificial intelligence system constructs an attractor from the time series group of data defining the previous behavior of the dynamic system, the attractor modeling the previous behavior of the dynamic system based on the predetermined amount of the time series group of data of the dynamic system;

wherein the quantum circuitry based network using qubits implementing the artificial intelligence system determines a prediction horizon for the predetermined amount of the time series group of data using an attractor dimension of the constructed attractor and a Lyapunov exponent of the constructed attractor, wherein the prediction horizon increases logarithmically as a length of the predetermined amount of the time series group of data from the dynamic system increases linearly;

wherein the quantum circuitry based network using qubits implementing the artificial intelligence system generates prediction values of future behavior of the dynamic system using the constructed attractor and the determined prediction horizon; and wherein the quantum circuitry based network using qubits implementing the artificial intelligence system constructs the attractor, determines the prediction horizon and generates the prediction values in applications.

35. The system of claim 34, wherein the quantum circuity based network using qubits implementing the artificial intelligence system is based on 2-dimensional qubits.

* * * * *